(12) United States Patent
Jin et al.

(10) Patent No.: US 10,581,671 B2
(45) Date of Patent: Mar. 3, 2020

(54) METHOD OF INDICATING CSI-RS, BASE STATION AND USER EQUIPMENT

(71) Applicant: CHINA MOBILE COMMUNICATIONS GROUP CO., LTD., Beijing (CN)

(72) Inventors: Jing Jin, Beijing (CN); Hui Tong, Beijing (CN); Qixing Wang, Beijing (CN)

(73) Assignee: CHINA MOBILE COMMUNICATIONS GROUP CO., LTD., Beijing (CN)

( * ) Notice: Subject to any disclaimer, the term of this patent is extended or adjusted under 35 U.S.C. 154(b) by 3 days.

(21) Appl. No.: 15/773,567

(22) PCT Filed: Sep. 13, 2016

(86) PCT No.: PCT/CN2016/098806
§ 371 (c)(1),
(2) Date: May 4, 2018

(87) PCT Pub. No.: WO2017/076128
PCT Pub. Date: May 11, 2017

(65) Prior Publication Data
US 2018/0324039 A1 Nov. 8, 2018

(30) Foreign Application Priority Data
Nov. 5, 2015 (CN) .......................... 2015 1 0746859

(51) Int. Cl.
*H04L 12/24* (2006.01)
*H04L 5/00* (2006.01)
(Continued)

(52) U.S. Cl.
CPC ....... *H04L 41/0803* (2013.01); *H04B 7/0626* (2013.01); *H04L 5/00* (2013.01);
(Continued)

(58) Field of Classification Search
None
See application file for complete search history.

(56) References Cited

U.S. PATENT DOCUMENTS

| | | | |
|---|---|---|---|
| 2011/0292847 A1* | 12/2011 | Yoon | H04L 5/0007 370/280 |
| 2012/0155414 A1* | 6/2012 | Noh | H04B 7/0417 370/329 |

(Continued)

FOREIGN PATENT DOCUMENTS

| | | |
|---|---|---|
| CN | 104365136 A | 2/2015 |
| CN | 104508989 A | 4/2015 |
| CN | 104995855 A | 10/2015 |

OTHER PUBLICATIONS

Park et al., "CSI-RS Transmissions in Special and Normal Subframes", U.S. Appl. No. 62/250,488, filed Nov. 3, 2015 (Year: 2015).*

(Continued)

*Primary Examiner* — Thinh D Tran
(74) *Attorney, Agent, or Firm* — Syncoda LLC; Feng Ma

(57) ABSTRACT

The disclosure discloses a method of indicating channel state information reference signal (CSI-RS), comprising: when transmitting a CSI-RS via a downlink pilot time slot (DwPTS), generating, by a base station, a radio resource control (RRC) signaling indicative of a CSI-RS resource configuration state; and transmitting, by a base station, the RRC signaling to user equipment (UE); wherein the step of generating the RRC signaling indicative of the CSI-RS resource configuration state includes configuring a first field of the RRC signaling to be a special time slot, and configuring a second field of the RRC signaling to be a CSI-RS pattern in the special time slot; the configured special time slot is configured to instruct the UE satisfying a predefined condition to obtain the CSI-RS pattern indicated in the second field; the first field indicates a CSI-RS subframe (Continued)

configuration state; and the second field indicates a CSI-RS configuration of channel state information. The disclosure also discloses a base station and UE.

24 Claims, 12 Drawing Sheets

(51) Int. Cl.
*H04W 76/27* (2018.01)
*H04B 7/06* (2006.01)
*H04W 88/02* (2009.01)
*H04W 88/08* (2009.01)

(52) U.S. Cl.
CPC ............ *H04L 5/0048* (2013.01); *H04W 76/27* (2018.02); *H04W 88/02* (2013.01); *H04W 88/08* (2013.01)

(56) References Cited

U.S. PATENT DOCUMENTS

| | | |
|---|---|---|
| 2014/0247759 A1 | 9/2014 | Zhang |
| 2014/0307872 A1 | 10/2014 | Heo |
| 2014/0378123 A1 | 12/2014 | Stojanovski |
| 2015/0004969 A1 | 1/2015 | Han |
| 2015/0009870 A1 | 1/2015 | Bashar |
| 2015/0078271 A1 | 3/2015 | Kim et al. |
| 2015/0131568 A1 | 5/2015 | You et al. |
| 2015/0139087 A1 | 5/2015 | Luft |
| 2015/0162966 A1* | 6/2015 | Kim .................... H04B 7/0456 370/252 |
| 2015/0188690 A1 | 7/2015 | Khoryaev et al. |
| 2015/0201374 A1 | 7/2015 | Yeh et al. |
| 2015/0215989 A1 | 7/2015 | Bangolae et al. |
| 2015/0223133 A1 | 8/2015 | Stojanovski |
| 2015/0249972 A1 | 9/2015 | You et al. |
| 2015/0280878 A1 | 10/2015 | Lee et al. |
| 2015/0327247 A1 | 11/2015 | Chen et al. |
| 2015/0334152 A1 | 11/2015 | Oyman |
| 2015/0341838 A1 | 11/2015 | Pinheiro et al. |
| 2015/0351139 A1 | 12/2015 | Mo-Han |
| 2015/0382281 A1 | 12/2015 | Sirotkin |
| 2016/0150509 A1 | 5/2016 | You et al. |
| 2016/0156454 A1 | 6/2016 | Khoryaev et al. |
| 2016/0183149 A1 | 6/2016 | Stojanovski et al. |
| 2016/0198343 A1 | 7/2016 | Heo et al. |
| 2016/0249406 A1 | 8/2016 | Bangolae et al. |
| 2017/0142691 A1 | 5/2017 | Sirotkin |
| 2017/0201898 A1* | 7/2017 | Park ....................... H04W 16/32 |
| 2018/0027581 A1 | 1/2018 | Khoryaev et al. |
| 2018/0035450 A1 | 2/2018 | Oyman |
| 2018/0063861 A1 | 3/2018 | Zhang et al. |
| 2018/0110064 A1 | 4/2018 | Stojanovski et al. |
| 2018/0167963 A1 | 6/2018 | Heo et al. |
| 2018/0323849 A1* | 11/2018 | Park ......................... H04L 5/00 |
| 2019/0059095 A1 | 2/2019 | Khoryaev et al. |

OTHER PUBLICATIONS

International Search Report in international application No. PCT/CN2016/098806, dated Dec. 1, 2016.

English Translation of The Written Opinion of the International Search Authority in international application No. PCT/CN2016/098806, dated Dec. 1, 2016.

CMCC, "Discussion on Additional Special Subframe Configuration", 3GPP TSG-RAN WG1#68bis R1-121712, Mar. 30, 2012(Mar. 30, 2012), pp. 1-6, mailed on Mar. 30, 2012.

3rd Generation Partnership Project; Technical Specification Group Radio Access Network; Evolved Universal Terrestrial Radio Access E-UTRA; "Physical Channels and Modulation(Release 12)", 3GPP TS 36.211 V12.7.0, Sep. 30, 2015(Sep. 30, 2015), pp. 1-6 and 106-110, mailed on Sep. 30, 2015.

CMCC: "Transmission of non-precoded CSI-RS" 3GPP Draft: R1-154300, 3rd Generation Partnership Project (3GPP). Mobile Competence Centre : 650. Route Des Lucioles: F-06921 Sophia-Antipolis Cedex ; Francevol. RAN WG1, No. Beijing. China: Aug. 24, 2015-Aug. 28, 2015Aug. 23, 2015 (Aug. 23, 2015), XP051001628, Retrieved from the Internet: URL:http://www.3gpp.org/ftp/Meetings 3GPP SYNC/RAN1/Docs/[retrieved on Aug. 23, 2015] p. 3; figure 4 *.

Supplementary European Search Report in the European application No. 16861396.6, dated Jun. 21, 2019.

* cited by examiner

| | CSI-RS configuration | Number of configured CSI-RSs | | | | | |
|---|---|---|---|---|---|---|---|
| | | 1 or 2 | | 4 | | 8 | |
| | | $(k',l')$ | $n_s \bmod 2$ | $(k',l')$ | $n_s \bmod 2$ | $(k',l')$ | $n_s \bmod 2$ |
| Frame structure types 1 and 2 | 0 | (9,5) | 0 | (9,5) | 0 | (9,5) | 0 |
| | 1 | (11,2) | 1 | (11,2) | 1 | (11,2) | 1 |
| | 2 | (9,2) | 1 | (9,2) | 1 | (9,2) | 1 |
| | 3 | (7,2) | 1 | (7,2) | 1 | (7,2) | 1 |
| | 4 | (9,5) | 1 | (9,5) | 1 | (9,5) | 1 |
| | 5 | (8,5) | 0 | (8,5) | 0 | | |
| | 6 | (10,2) | 1 | (10,2) | 1 | | |
| | 7 | (8,2) | 1 | (8,2) | 1 | | |
| | 8 | (6,2) | 1 | (6,2) | 1 | | |
| | 9 | (8,5) | 1 | (8,5) | 1 | | |
| | 10 | (3,5) | 0 | | | | |
| | 11 | (2,5) | 0 | | | | |
| | 12 | (5,2) | 1 | | | | |
| | 13 | (4,2) | 1 | | | | |
| | 14 | (3,2) | 1 | | | | |
| | 15 | (2,2) | 1 | | | | |
| | 16 | (1,2) | 1 | | | | |
| | 17 | (0,2) | 1 | | | | |
| | 18 | (3,5) | 1 | | | | |
| | 19 | (2,5) | 1 | | | | |
| Only frame structure type 2 | 20 | (11,1) | 1 | (11,1) | 1 | (11,1) | 1 |
| | 21 | (9,1) | 1 | (9,1) | 1 | (9,1) | 1 |
| | 22 | (7,1) | 1 | (7,1) | 1 | (7,1) | 1 |
| | 23 | (10,1) | 1 | (10,1) | 1 | | |
| | 24 | (8,1) | 1 | (8,1) | 1 | | |
| | 25 | (6,1) | 1 | (6,1) | 1 | | |
| | 26 | (5,1) | 1 | | | | |
| | 27 | (4,1) | 1 | | | | |
| | 28 | (3,1) | 1 | | | | |
| | 29 | (2,1) | 1 | | | | |
| | 30 | (1,1) | 1 | | | | |
| | 31 | (0,1) | 1 | | | | |

METHOD OF INDICATING CSI-RS, BASE STATION AND USER EQUIPMENT

CROSS-REFERENCE TO RELATED APPLICATIONS

The present application claims priority to Chinese Patent Application No. 201510746859.1, filed on Nov. 5, 2015, the contents of which are hereby incorporated by reference in its entirety.

TECHNICAL FIELD

The present disclosure relates to the field of wireless communications, and particularly to a Channel State Information-Reference Signal (CSI-RS) indication method, a system, a base station and User Equipment (UE).

BACKGROUND

A related communication system (for example, a Long Term Evolution (LTE) system, a Worldwide Interoperability for Microwave Access (WiMax) system, a Wireless Local Area Networks (WLAN) system using an 802.11n standard) adopts a 2nd-Dimensional (2D) Multiple-Input Multiple-Output (MIMO) technology, of which a basic principle is to improve transmission quality and increase a system capacity by a degree of 2D spatial freedom of an antenna on a horizontal plane.

However, under the present background that no big breaks are made to a physical layer technology, how to further improve spectrum efficiency of a wireless communication system is a hot research issue. At present, a relatively feasible solution is to fully explore a degree of vertical spatial freedom to extend a conventional 2D MIMO technology to a 3rd-Dimensional (3D) MIMO technology and improve system performance by fully utilizing a degree of 3D spatial freedom.

At the same time, when a 3D MIMO technology is used, along with development of a communication technology, 12 and 16-port CSI-RSs increase a pilot overhead, so that a CSI-RS is allowed to be transmitted through a Downlink Pilot Time Slot (DwPTS). However, when Radio Resource Control (RRC) signaling is adopted to indicate a configuration parameter for transmitting the CSI-RS through the DwPTS, the related RRC signaling is required to be greatly modified, so that a signaling overhead is greatly increased. Therefore, how to implement transmission of a CSI-RS through a DwPTS on the basis of not modifying related RRC signaling is a problem urgent to be solved at present.

SUMMARY

In order to solve the technical problem existing in a related technology, embodiments of the disclosure provide a CSI-RS indication method, a system, a base station and UE.

In order to achieve the purpose, the technical solutions of the embodiments of the disclosure are implemented as follows.

The embodiments of the disclosure provide a CSI-RS indication method, which may be applied to a base station. The method includes the following actions.

When a CSI-RS is transmitted through a DwPTS, RRC signaling that indicates a CSI-RS resource configuration is generated.

The RRC signaling is sent to UE.

When the RRC signaling that indicates the CSI-RS resource configuration is generated, a first field in the RRC signaling may be configured to indicate a special slot, and a second field in the RRC signaling may be configured to indicate a CSI-RS pattern in the special slot; the configured special slot may be configured to indicate the UE meeting a preset condition to acquire the CSI-RS pattern indicated by the second field.

The first field may represent a CSI-RS subframe configuration, and the second field may represent a CSI-RS configuration.

According to an embodiment, the first field may be subframeConfig-r12, and the second field may be resourceConfig-r12;

or, the first field may be subframeConfig-r11, and the second field may be resourceConfig-r11 or resourceConfigList-r11;

or, the first field may be subframeConfig-r10, and the second field may be resourceConfig-r10.

According to an embodiment, the action of configuring the second field in the RRC signaling to indicate the CSI-RS pattern in the special slot may include the following actions.

The second field is configured to indicate a serial number corresponding to the CSI-RS pattern in the special slot in a CSI-RS configuration parameter table.

The CSI-RS configuration parameter indication table may include 20 1-port CSI-RS configuration parameters, 20 2-port CSI-RS configuration parameters, 10 4-port CSI-RS configuration parameters and 5 8-port CSI-RS configuration parameters.

The 20 1-port CSI-RS configuration parameters may be the same as the 20 2-port CSI-RS configuration parameters.

According to an embodiment, when the second field is resourceConfig-r12, resourceConfig-r11 or resourceConfig-r10, the second field may have a value up to 20; and when the second field is resourceConfigList-r11, resourceConfigList-r11 may have a value up to 10, and may indicate multiple 4-port and 8-port CSI-RS configuration parameters.

According to an embodiment, the 20 1-port or 2-port CSI-RS configuration parameters may include the following parameters: k' is 9, l' is 2 and $n_s$ mod 2 is 0; k' is 8, l is 2 and $n_s$ mod 2 is 0; k' is 3, l' is 2 and $n_s$ mod 2 is 0; k' is 2, l' is 2 and $n_s$ mod 2 is 0; k' is 11, l' is 5 and $n_s$ mod 2 is 0; k' is 10, l' is 5 and $n_s$ mod 2 is 0; k' is 7, l' is 5 and $n_s$ mod 2 is 0; k' is 6, l' is 5 and $n_s$ mod 2 is 0; k' is 5, l' is 5 and $n_s$ mod 2 is 0; k' is 4, l' is 5 and $n_s$ mod 2 is 0; k' is 1, l' is 5 and $n_s$ mod 2 is 0; k' is 0, l' is 5 and $n_s$ mod 2 is 0; k' is 9, l' is 5 and $n_s$ mod 2 is 0; k is 8, l' is 5 and $n_s$ mod 2 is 0; k' is 3, l' is 5 and $n_s$ mod 2 is 0; k' is 2, l' is 5 and $n_s$ mod 2 is 0; k' is 9, l' is 2 and $n_s$ mod 2 is 1; k' is 8, l' is 2 and $n_s$ mod 2 is 1; k' is 3, l is 2 and $n_s$ mod 2 is 1; and k' is 2, l is 2 and $n_s$ mod 2 is 1.

A location of a Resource Element (RE) occupied by the CSI-RS in a Physical Resource Block (PRB) pair may be represented by (k', l') k' may represent a row where the RE is located, l' may represent a column where the RE is located, and $n_s$ may represent a slot number.

According to an embodiment, the 10 4-port CSI-RS configuration parameters may include the following parameters: k' is 9, l' is 2 and $n_s$ mod 2 is 0; k is 8, l' is 2 and $n_s$ mod 2 is 0; k' is 11, l' is 5 and $n_s$ mod 2 is 0; k' is 10, l is 5 and $n_s$ mod 2 is 0; k' is 7, l' is 5 and $n_s$ mod 2 is 0; k' is 6, l' is 5 and $n_s$ mod 2 is 0; k' is 5, l' is 5 and $n_s$ mod 2 is 0; k' is 8, l' is 5 and $n_s$ mod 2 is 0; k' is 9, l' is 2 and $n_s$ mod 2 is 1; and k' is 8, l' is 2 and $n_s$ mod 2 is 1.

The location of the RE occupied by the CSI-RS in the PRB pair may be represented by (k', l'), k' may represent the row where the RE is located, l' may represent the column where the RE is located, and $n_s$ may represent the slot number.

According to an embodiment, the 5 8-port CSI-RS configuration parameters may include the following parameters: k' is 9, l' is 2 and $n_s$ mod 2 is 0; k' is 11, l' is 5 and $n_s$ mod 2 is 0; k' is 7, l' is 5 and $n_s$ mod 2 is 0; k' is 9, l' is 5 and $n_s$ mod 2 is 0; and k' is 9, l' is 2 and $n_s$ mod 2 is 1.

The location of the RE occupied by the CSI-RS in the PRB pair may be represented by (k', l') k' may represent the row where the RE is located, l' may represent the column where the RE is located, and $n_s$ may represent the slot number.

According to an embodiment, the action of configuring the second field in the RRC signaling to indicate the CSI-RS pattern in the special slot may include the following actions.

The second field is configured to indicate a corresponding relationship between a default CSI-RS pattern and a CSI-RS pattern in the special slot, the corresponding relationship including a corresponding relationship between l' and $n_s$ mod 2.

When l' in the default CSI-RS pattern is more than 3, l' in the CSI-RS pattern in the special slot may be a difference between l' in the default CSI-RS pattern and 3.

When l' in the default CSI-RS pattern is less than or equal to 3, l' in the CSI-RS pattern in the special slot may be a remainder obtained through dividing, by 7, a sum of l' in the default CSI-RS pattern and 10.

When l' in the default CSI-RS pattern is more than 3 and $n_s$ mod 2 in the default CSI-RS pattern is equal to 1, $n_s$ mod 2 in the CSI-RS pattern in the special slot may be 1.

Except when l' in the default CSI-RS pattern is more than 3 and $n_s$ mod 2 in the default CSI-RS pattern is equal to 1, $n_s$ mod 2 in the CSI-RS pattern in the special slot may be 0.

The location of the RE occupied by the CSI-RS in the PRB pair may be represented by (k', l') k' may represent the row where the RE is located, l' may represent the column where the RE is located, and $n_s$ may represent the slot number.

According to an embodiment, the action of configuring the second field in the RRC signaling to indicate the CSI-RS pattern in the special slot may include the following actions.

A CSI-RS configuration in the special slot is generated according to an offset of the CSI-RS pattern in the special slot from the default CSI-RS pattern.

When l' in the default CSI-RS pattern is more than 3, the CSI-RS pattern in the special slot may be obtained by shifting the default CSI-RS pattern leftwards by 3 Orthogonal Frequency Division Multiplexing (OFDM) symbols.

When l' in the default CSI-RS pattern is less than or equal to 3, the CSI-RS pattern in the special slot may be obtained by shifting l' in the default CSI-RS pattern leftwards by 4 OFDM symbols.

The location of the RE occupied by the CSI-RS in the PRB pair may be represented by (k', l') k' may represent the row where the RE is located, each row may be a subcarrier, l' may represent the column where the RE is located, and each column may be an OFDM symbol.

The embodiments of the disclosure further provide a CSI-RS indication method, which may be applied to UE. The method includes the following actions.

When a CSI-RS is transmitted through a DwPTS, RRC signaling that indicates a CSI-RS resource configuration is received.

A first field in the RRC signaling is acquired.

When the first field is determined to indicate a special slot and the UE meets a preset condition, a CSI-RS pattern in the special slot is determined according to a CSI-RS pattern indicated by a second field in the RRC signaling.

The first field indicating a CSI-RS subframe configuration and the second field indicating a CSI-RS configuration.

According to an embodiment, the action of determining the CSI-RS pattern in the special slot according to the CSI-RS pattern indicated by the second field in the RRC signaling may the following actions.

A serial number corresponding to the CSI-RS pattern in the special slot indicated by the second field is acquired in a CSI-RS configuration parameter indication table.

The CSI-RS pattern in the special slot is determined according to an acquired number of CSI-RS ports and the serial number.

The CSI-RS configuration parameter indication table includes 20 1-port CSI-RS configuration parameters, 20 2-port CSI-RS configuration parameters, 10 4-port CSI-RS configuration parameters and 5 8-port CSI-RS configuration parameters.

The 20 1-port CSI-RS configuration parameters may be the same as the 20 2-port CSI-RS configuration parameters.

According to an embodiment, the action of determining the CSI-RS pattern in the special slot according to the CSI-RS pattern indicated by the second field in the RRC signaling may include the following actions.

A corresponding relationship, indicated by the second field, between a default CSI-RS pattern and a CSI-RS pattern in the special slot is acquired, the corresponding relationship including a corresponding relationship between l' and $n_s$ mod 2.

The CSI-RS pattern in the special slot is determined according to the corresponding relationship and the default CSI-RS pattern.

The action of determining the CSI-RS pattern in the special slot according to the corresponding relationship and the default CSI-RS pattern may include the following actions.

When l' in the default CSI-RS pattern is more than 3, a difference between l' in the default CSI-RS pattern and 3 is calculated to obtain l' in the CSI-RS pattern in the special slot.

When l' in the default CSI-RS pattern is less than or equal to 3, l' in the CSI-RS pattern in the special slot is determined to be a remainder obtained through dividing, by 7, a sum of l' in the default CSI-RS pattern and 10.

When l' in the default CSI-RS pattern is more than 3 and $n_s$ mod 2 in the default CSI-RS pattern is equal to 1, $n_s$ mod 2 in the CSI-RS pattern in the special slot is determined to be 1.

Except when l' in the default CSI-RS pattern is more than 3 and $n_s$ mod 2 in the default CSI-RS pattern is equal to 1, $n_s$ mod 2 in the CSI-RS pattern in the special slot is determined to be 0.

A location of an RE occupied by the CSI-RS in a PRB pair being represented by (k, l') k' indicating a row where the RE is located, l' indicating a column where the RE is located and $n_s$ indicating a slot number.

According to an embodiment, the action of determining the CSI-RS pattern in the special slot according to the CSI-RS pattern indicated by the second field in the RRC signaling may include the following actions.

A CSI-RS configuration in the special slot indicated by the second field is acquired, where the CSI-RS configuration in the special slot is generated according to an offset of the CSI-RS pattern in the special slot from the default CSI-RS pattern.

The CSI-RS pattern in the special slot is determined according to the configuration and the default CSI-RS pattern.

When l' in the default CSI-RS pattern is more than 3, the CSI-RS pattern in the special slot may be obtained by shifting the default CSI-RS pattern leftwards by 3 OFDM symbols.

When l' in the default CSI-RS pattern is less than or equal to 3, the CSI-RS pattern in the special slot may be obtained by shifting l' in the default CSI-RS pattern leftwards by 4 OFDM symbols.

The location of the RE occupied by the CSI-RS in the PRB pair may be represented by (k', l') k' may represent the row where the RE is located, each row may be a subcarrier, l' may represent the column where the RE is located, and each column may be an OFDM symbol.

The embodiments of the disclosure further provide a base station, which may include: a generation unit and a sending unit.

The generation unit may be configured to, when a CSI-RS is transmitted through a DwPTS, generate RRC signaling that indicates a CSI-RS resource configuration.

The sending unit may be configured to send the RRC signaling to UE.

When the RRC signaling that indicates the CSI-RS resource configuration is generated, the generation unit may configure a first field in the RRC signaling to indicate a special slot and configure a second field in the RRC signaling to indicate a CSI-RS pattern in the special slot; the configured special slot may be configured to indicate the UE meeting a preset condition to acquire the CSI-RS pattern indicated by the second field.

The first field may represent a CSI-RS subframe configuration, and the second field may represent a CSI-RS configuration.

According to an embodiment, the generation unit may specifically be configured to configure the second field to be a serial number corresponding to the CSI-RS pattern in the special slot in a CSI-RS configuration parameter table.

The CSI-RS configuration parameter indication table may include 20 1-port CSI-RS configuration parameters, 20 2-port CSI-RS configuration parameters, 10 4-port CSI-RS configuration parameters and 5 8-port CSI-RS configuration parameters.

The 20 1-port CSI-RS configuration parameters may be the same as the 20 2-port CSI-RS configuration parameters.

According to an embodiment, the generation unit may specifically be configured to configure the second field to indicate a corresponding relationship between a default CSI-RS pattern and a CSI-RS pattern in the special slot, the corresponding relationship including a corresponding relationship between l' and $n_s$ mod 2.

When l' in the default CSI-RS pattern is more than 3, l' in the CSI-RS pattern in the special slot may be a difference between l' in the default CSI-RS pattern and 3.

When l' in the default CSI-RS pattern is less than or equal to 3, l' in the CSI-RS pattern in the special slot may be a remainder obtained through dividing, by 7, a sum of l' in the default CSI-RS pattern and 10.

When l' in the default CSI-RS pattern is more than 3 and $n_s$ mod 2 in the default CSI-RS pattern is equal to 1, $n_s$ mod 2 in the CSI-RS pattern in the special slot may be 1.

Except when l' in the default CSI-RS pattern is more than 3 and $n_s$ mod 2 in the default CSI-RS pattern is equal to 1, $n_s$ mod 2 in the CSI-RS pattern in the special slot may be 0.

A location of an RE occupied by the CSI-RS in a PRB pair may be represented by (k', l'), k' may represent a row where the RE is located, l' may represent a column where the RE is located, and $n_s$ may represent a slot number.

According to an embodiment, the generation unit may specifically be configured to:

generate a CSI-RS configuration in the special slot according to an offset of the CSI-RS pattern in the special slot from the default CSI-RS pattern.

When l' in the default CSI-RS pattern is more than 3, the CSI-RS pattern in the special slot may be obtained by shifting the default CSI-RS pattern leftwards by 3 OFDM symbols.

When l' in the default CSI-RS pattern is less than or equal to 3, the CSI-RS pattern in the special slot may be obtained by shifting l' in the default CSI-RS pattern leftwards by 4 OFDM symbols.

The location of the RE occupied by the CSI-RS in the PRB pair may be represented by (k', l') k' may represent the row where the RE is located, each row may be a subcarrier, l' may represent the column where the RE is located, and each column may be an OFDM symbol.

The embodiments of the disclosure further provide UE, which may include: a receiving unit, a first acquisition unit and a second acquisition unit.

The receiving unit may be configured to, when a CSI-RS is transmitted through a DwPTS, receive RRC signaling that indicates a CSI-RS resource configuration.

The first acquisition unit may be configured to acquire a first field in the RRC signaling.

The second acquisition unit may be configured to, when the first field is determined to indicate a special slot and the UE meets a preset condition, determine a CSI-RS pattern in the special slot according to a CSI-RS pattern indicated by a second field in the RRC signaling.

The first field indicating a CSI-RS subframe configuration and the second field indicating a CSI-RS configuration.

According to an embodiment, the second acquisition unit may specifically be configured to acquire, in a CSI-RS configuration parameter indication table, a serial number corresponding to the CSI-RS pattern in the special slot indicated by the second field, and determine the CSI-RS pattern in the special slot according to an acquired number of CSI-RS ports and the serial number.

The CSI-RS configuration parameter indication table includes 20 1-port CSI-RS configuration parameters, 20 2-port CSI-RS configuration parameters, 10 4-port CSI-RS configuration parameters and 5 8-port CSI-RS configuration parameters.

The 20 1-port CSI-RS configuration parameters may be the same as the 20 2-port CSI-RS configuration parameters.

According to an embodiment, the second acquisition unit may specifically be configured to:

acquire a corresponding relationship, indicated by the second field, between a default CSI-RS pattern and a CSI-RS pattern in the special slot, the corresponding relationship including a corresponding relationship between l' and $n_s$ mod 2, and determine the CSI-RS pattern in the special slot according to the corresponding relationship and the default CSI-RS pattern.

The action of determining the CSI-RS pattern in the special slot according to the corresponding relationship and the default CSI-RS pattern may include the following actions.

When l' in the default CSI-RS pattern is more than 3, a difference between l' in the default CSI-RS pattern and 3 is calculated to obtain l' in the CSI-RS pattern in the special slot.

When l' in the default CSI-RS pattern is less than or equal to 3, l' in the CSI-RS pattern in the special slot is determined to be a remainder obtained through dividing, by 7, a sum of l' in the default CSI-RS pattern and 10.

When l' in the default CSI-RS pattern is more than 3 and $n_s$ mod 2 in the default CSI-RS pattern is equal to 1, $n_s$ mod 2 in the CSI-RS pattern in the special slot is determined to be 1.

Except when l' in the default CSI-RS pattern is more than 3 and $n_s$ mod 2 in the default CSI-RS pattern is equal to 1, $n_s$ mod 2 in the CSI-RS pattern in the special slot is determined to be 0.

A location of an RE occupied by the CSI-RS in a PRB pair being represented by (k', l') k' indicating a row where the RE is located, l' indicating a column where the RE is located and $n_s$ indicating a slot number.

According to an embodiment, the second acquisition unit may specifically be configured to:

acquire a CSI-RS configuration in the special slot indicated by the second field, where the CSI-RS configuration in the special slot is generated according to an offset of the CSI-RS pattern in the special slot from the default CSI-RS pattern, and determine the CSI-RS pattern in the special slot according to the configuration and the default CSI-RS pattern.

When l' in the default CSI-RS pattern is more than 3, the CSI-RS pattern in the special slot may be obtained by shifting the default CSI-RS pattern leftwards by 3 OFDM symbols.

When l' in the default CSI-RS pattern is less than or equal to 3, the CSI-RS pattern in the special slot may be obtained by shifting l' in the default CSI-RS pattern leftwards by 4 OFDM symbols.

The location of the RE occupied by the CSI-RS in the PRB pair may be represented by (k', l') k' may represent the row where the RE is located, each row may be a subcarrier, l' may represent the column where the RE is located, and each column may be an OFDM symbol.

The embodiments of the disclosure further provide a CSI-RS indication system, which may include: a base station and UE.

The base station may be configured to, when a CSI-RS is transmitted through a DwPTS, generate RRC signaling that indicates a CSI-RS resource configuration, and send the RRC signaling to the UE, where, when the RRC signaling that indicates the CSI-RS resource configuration is generated, a first field in the RRC signaling may be configured to indicate a special slot, and a second field in the RRC signaling may be configured to indicate a CSI-RS pattern in the special slot.

The UE may be configured to receive the RRC signaling, acquire the first field in the RRC signaling, and when the first field is determined to indicate the special slot and the UE meets a preset condition, determine the CSI-RS pattern in the special slot according to the CSI-RS pattern indicated by the second field in the RRC signaling.

The first field indicates a CSI-RS subframe configuration and the second field indicates a CSI-RS configuration.

According to the CSI-RS indication method, system, base station and UE provided by the embodiments of the disclosure, when the CSI-RS is transmitted through the DwPTS, the RRC signaling that indicates the CSI-RS resource configuration is generated. The RRC signaling is sent to the UE. When the RRC signaling that indicates the CSI-RS resource configuration is generated, the first field in the RRC signaling is configured to indicate the special slot, the second field in the RRC signaling is configured to indicate the CSI-RS pattern in the special slot, and the UE receives the RRC signaling. The first field in the RRC signaling is acquired. When the first field is determined to indicate the special slot and the UE meets the preset condition, the CSI-RS pattern in the special slot is determined according to the CSI-RS pattern indicated by the second field in the RRC signaling. The first field indicates the CSI-RS subframe configuration and the second field indicates the CSI-RS configuration. Therefore, the related RRC signaling is not required to be modified, and a signaling overhead is greatly reduced.

BRIEF DESCRIPTION OF DRAWINGS

In the drawings (which are not always drawn to scale), similar parts may be described with similar drawing reference signs in different views. Similar drawing reference signs with different letter suffixes may represent different examples of similar parts. The drawings substantially show each embodiment discussed in the disclosure exemplarily but unlimitedly.

FIG. 2A-B are schematic diagrams of a CSI-RS pattern in an 8-port CSI-RS indication according to the related technology.

FIG. 3 is a CSI-RS configuration parameter indication table according to the related technology.

FIG. 4 is a design diagram of an 8-port CSI-RS in special slot configurations #3, 4 and 8.

FIG. 5 is a design diagram of an 8-port CSI-RS in special slot configurations #1, 26 and 7.

DETAILED DESCRIPTION

The disclosure will further be described below in combination with the drawings and embodiments in detail.

Figure 1:
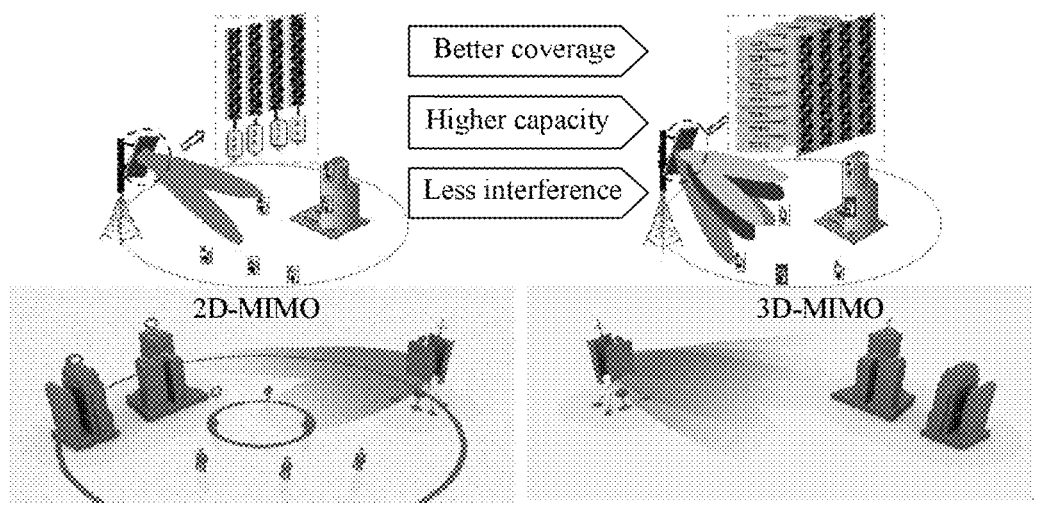
FIG. 1 is a principle and effect diagram of a 3D MIMO technology according to the related technology.

Before the embodiments of the disclosure are described, related contents of 2D MIMO and 3D MIMO technologies are understood with reference to FIG. 1.

Specifically, in the 2D MIMO technology, an antenna architecture is as follows: multiple array elements are adopted in a vertical dimension, that is, N antennae are adopted, so that a higher antenna gain is obtained; and each antenna array element in the vertical dimension adopts a fixed weight to ensure that a required beam pattern is obtained in the vertical dimension. Therefore, under such a condition, it is impossible to use a precoding solution in the vertical dimension in the MIMO technology.

In the 3D MIMO technology, for fully utilizing the MIMO technology in the vertical dimension, weighting factors of different antenna array elements in the vertical dimension may be controlled to form different beams. The beams in the vertical dimension may be effectively distinguished, thereby providing multiple-user multiplexing in the vertical dimension and increasing a system capacity, as shown in FIG. 1. A conventional LTE system supports a design of maximally 8 antennae, and 3D MIMO extends an antenna channel number, and supports a 3D antenna form with a channel number of 16, 32, 64, 128 and the like.

Second, design of a CSI-RS in the related technology is understood.

Figure 2A:
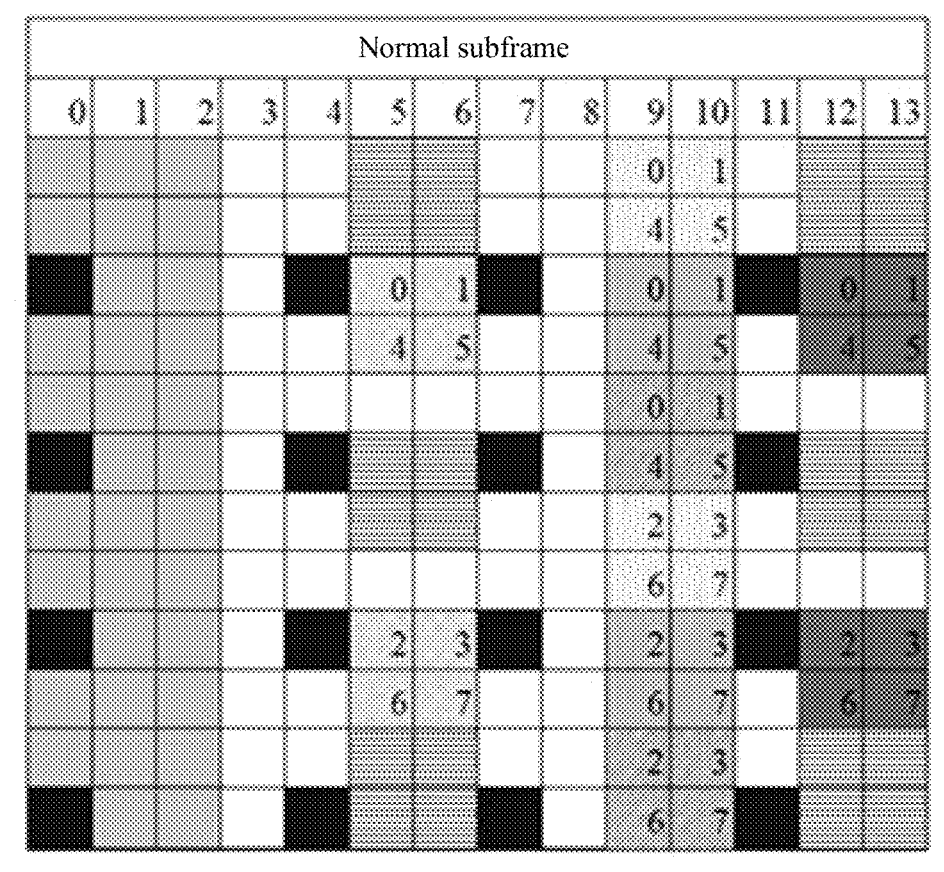
Figure 2B:
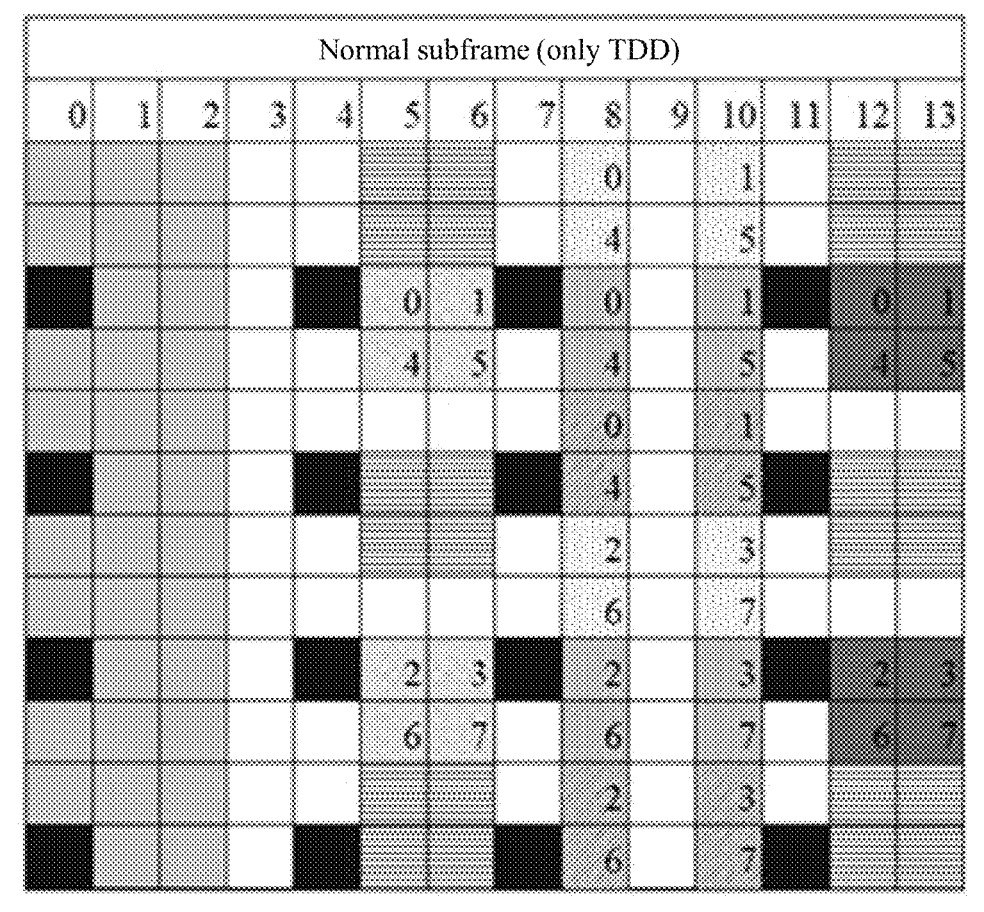

FIG. 2 is a related CSI-RS pattern in an 8-port CSI-RS indication, and FIG. 3 is a related configuration parameter indication table. In combination with FIG. 2 and FIG. 3, it can be seen that, in the present standard 3rd Generation Partnership Project (3GPP) Release 12 (R12), an overhead of a CSI-RS configuration parameter is an RE in a PRB of a port. From FIG. 2, it can be seen that, in the related standard, there may be multiple CSI-RS configurations. For example, in an 8-port Frequency Division Duplexing (FDD) system, there are 5 configurations (distinguished with different filling colors), and the specific CSI-RS configuration to be adopted is notified to UE through high-layer signaling.

Moreover, it is specified in the related standard that, in a special slot (DwPTS) of a Time Division Duplexing (TDD) system, no CSI-RS is sent (The UE shall assume that CSI reference signals are not transmitted in the DwPTS(s) in case of frame structure type 2).

However, introduction of 12 and 16-port CSI-RSs into a new standard (3GPP R13) increases a pilot overhead, so that CSI-RSs have been allowed in discussion of the R13 standard to be send in downlink parts (DwPTSs) of special slots.

Table 1 shows a configuration of a special slot. From Table 1, it can be seen that #1, 2, 3, 4, 6, 7 and 8 are configured for the special slot (a DwPTS includes 9~12 OFDM symbols), so that a CSI-RS may be transmitted in the DwPTS. While in another special slot configuration, the DwPTS includes a small number of OFDM symbols, so that supporting transmission of the CSI-RS is not suggested.

In addition, at present, when CSI-RS configuration parameter information is acquired, UE acquires a sending period of a CSI-RS and an offset of a subframe where it is located through subframeConfig-r10 in an Information Element (IE)-CSI-RS-Config in TS36.331, and then acquires a specific CSI-RS pattern through resourceConfigu-r10. Or the UE acquires the sending period of the CSI-RS and the offset of the subframe where it is located through subframeConfig-r11 in an IE-CSI-RS-ConfigNZP, and then acquires the specific CSI-RS pattern through resourceConfig-r11. Or the UE acquires the sending period of the CSI-RS and the offset of the subframe where it is located through subframeConfig-r11 in an IE-CSI-RS-ConfigZP, and then acquires the specific CSI-RS pattern through resourceConfigList-r11. Or the UE acquires the sending period of the CSI-RS and the offset of the subframe where it is located through subframeConfig-r12 in CSI-IM-Config, and then acquires the specific CSI-RS pattern through resourceConfig-r12.

From the above descriptions, it can be seen that, during transmission of the CSI-RS through the DwPTS, when the corresponding CSI-RS configuration parameter information is still transmitted to the UE through RRC signaling at this point, if a format of the related RRC signaling is still adopted, there may exist the following condition:

considering 20 new configurations about the CSI-RS in the DwPTS are not included in the related RRC signaling resourceConfig-r12, resourceConfig-r11, resourceConfiguList-r11 and resourceConfig-r10, so that it is necessary to add a piece of new signaling to indicate a CSI-RS configuration in the special slot. A field dedicated to indicate a CSI-RS configuration of R13 may be added, for example, resourceConfig-r13 and/or resourceConfigList-r13.

In such a manner, the solution not only involves standard modification to a Radio Access Network 1 (RAN1), but also requires modification to a standard protocol of a RAN2, so that the standard is greatly modified, that is, the related RRC

TABLE 1

| Special subframe configuration | Normal cyclic prefix in downlink | | | Extended cyclic prefix in downlink | | |
|---|---|---|---|---|---|---|
| | DwPTS | UpPTS | | DwPTS | UpPTS | |
| | | Normal cyclic prefix in uplink | Extended cyclic prefix in uplink | | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 4:
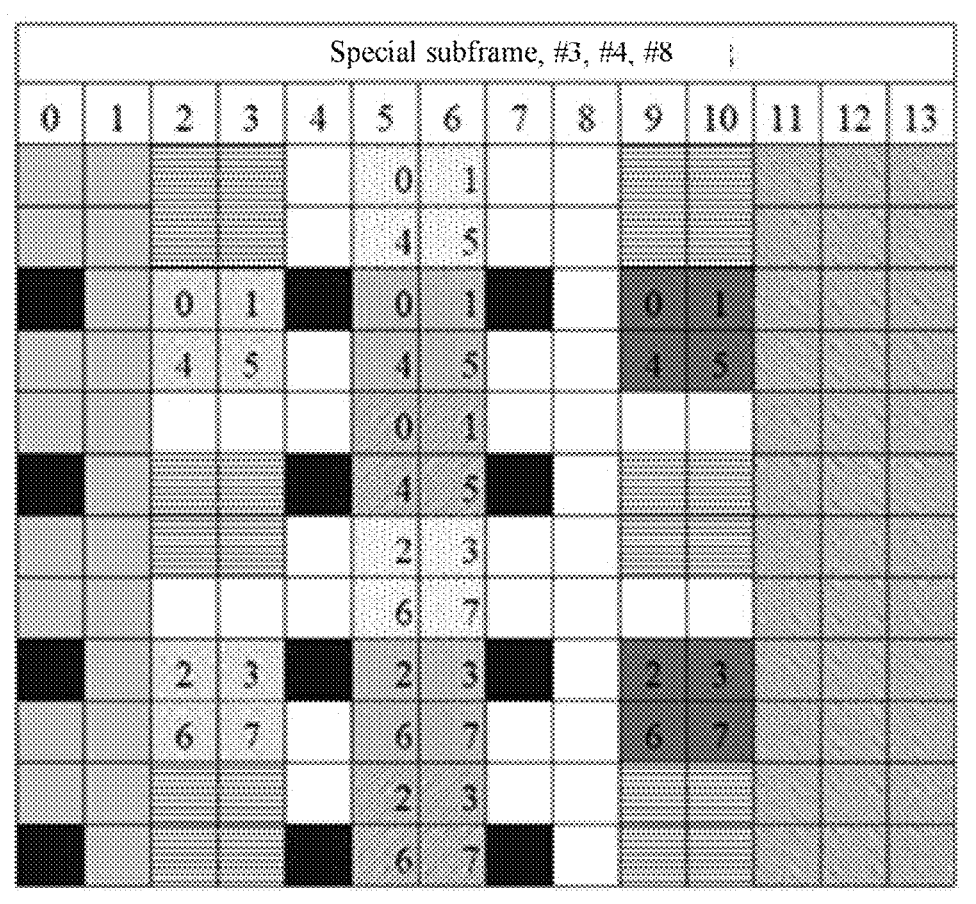
Figure 5:
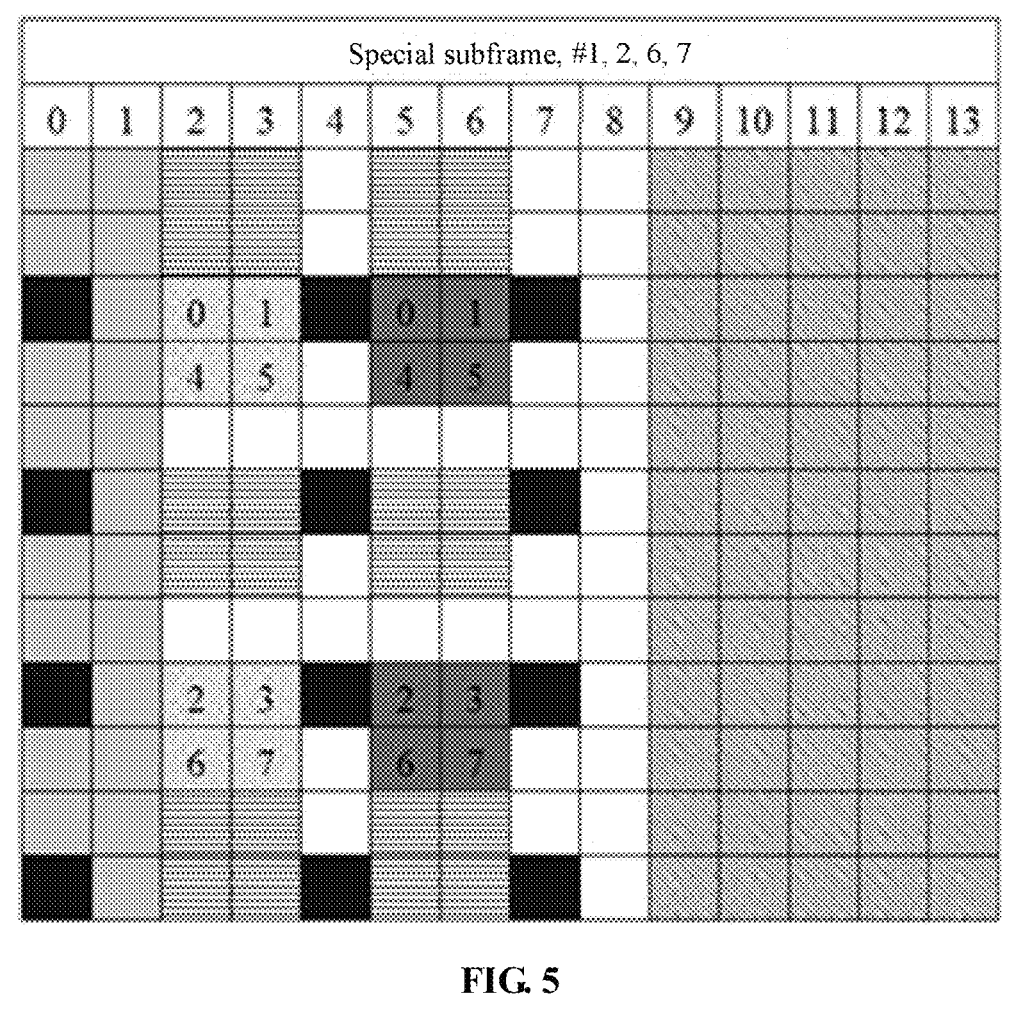

On such a basis, someone proposes 8-port CSI-RS designs shown in FIG. 4 and FIG. 5 in case of transmission of CSI-RSs through a DwPTS, i.e. CSI-RS patterns in a CSI-RS indication.

During a practical application, a 16-port design may adopt a combination of 2 8-port designs, and a 12-port design may adopt a combined form of 3 4-port designs or an 8+4 design.

signaling is required to be modified more. Therefore, a signaling overhead is increased.

On such a basis, in each embodiment of the disclosure: when a CSI-RS is transmitted through a DwPTS, a base station generates RRC signaling that indicates a CSI-RS resource configuration, and sends the RRC signaling to UE, where, when the RRC signaling that indicates the CSI-RS resource configuration is generated, a first field in the RRC signaling is configured to indicate a special slot, and a second field in the RRC signaling is configured to indicate a CSI-RS pattern in the special slot; and the UE receives the RRC signaling, acquires the first field in the RRC signaling, and when the first field is determined to indicate the special slot and the UE meets a preset condition, the CSI-RS pattern in the special slot is determined according to the CSI-RS pattern indicated by the second field in the RRC signaling, the first field indicating a CSI-RS subframe configuration and the second field indicating the CSI-RS configuration.

Figure 6:
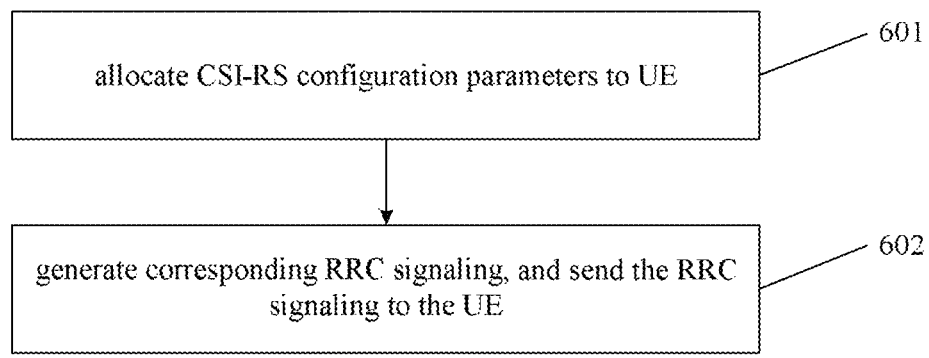
FIG. 6 is a flowchart of a CSI-RS indication method for a base station side according to some embodiments of the disclosure.

In the embodiments, the embodiments provide a CSI-RS indication method, which is applied to a base station. As shown in FIG. 6, the method includes the following steps.

In 601, when a CSI-RS is transmitted through a DwPTS, CSI-RS configuration parameters are allocated to UE.

In 602, RRC signaling that indicates a CSI-RS resource configuration is generated according to information about the CSI-RS configuration parameters allocated to the UE, and the RRC signaling is sent to the UE.

Here, when the RRC signaling that indicates the CSI-RS resource configuration is generated, a first field in the RRC signaling is configured to indicate a special slot, and a second field in the RRC signaling is configured to indicate a CSI-RS pattern in the special slot; and the configured special slot is configured to indicate the UE meeting a preset condition to acquire the CSI-RS pattern indicated by the second field.

Here, the first field indicates a CSI-RS subframe configuration, and the second field indicates a CSI-RS configuration.

The first field and the second field may adopt related fields in the 3GPP R12 standard.

During a practical application, for different protocol versions, values of the first field and the second field may also be different, specifically as follows:

for the 3GPP R12, the first field is subframeConfig-r12, and the second field is resourceConfig-r12;

for the 3GPP R11, the first field is subframeConfig-r11, and the second field is resourceConfig-r11 or resourceConfigList-r11; and for the 3GPP R10, the first field may be subframeConfig-r10, and the second field may be resourceConfig-r10.

The preset condition refers to that the UE is new UE, rather than conventional UE (legacy UE).

Where, the conventional UE refers to UE meeting the 3GPP R12 (namely meeting the 3GPP R12 standard) and versions before the 3GPP R12; and correspondingly, the new UE refers to UE meeting the 3GPP R13 (meeting the 3GPP R13 standard).

During a practical application, when the conventional UE receives the RRC signaling and it is determined that the first field in the RRC signaling indicates the special slot, mistaken transmission is determined.

When a CSI-RS configuration parameter indication table is adopted, the operation that the second field in the RRC signaling is configured to indicate the CSI-RS pattern in the special slot specifically includes that:

the second field is configured to indicate a serial number corresponding to the CSI-RS pattern in the special slot in the CSI-RS configuration parameter table; and the CSI-RS configuration parameter indication table includes 20 1-port CSI-RS configuration parameters, 20 2-port CSI-RS configuration parameters, 10 4-port CSI-RS configuration parameters and 5 8-port CSI-RS configuration parameters, where the 20 1-port CSI-RS configuration parameters are the same as the 20 2-port CSI-RS configuration parameters.

Here, the 20 1-port or 2-port CSI-RS configuration parameters include the following parameters: k is 9, l' is 2 and $n_s$ mod 2 is 0; k is 8, l' is 2 and $n_s$ mod 2 is 0; k' is 3, l' is 2 and $n_s$ mod 2 is 0; k' is 2, l' is 2 and $n_s$ mod 2 is 0; k' is 11, l' is 5 and $n_s$ mod 2 is 0; k' is 10, l' is 5 and $n_s$ mod 2 is 0; k' is 7, l' is 5 and $n_s$ mod 2 is 0; k' is 6, l' is 5 and $n_s$ mod 2 is 0; k' is 5, l' is 5 and $n_s$ mod 2 is 0; k' is 4, l' is 5 and $n_s$ mod 2 is 0; k' is 1, l' is 5 and $n_s$ mod 2 is 0; k' is 0, l' is 5 and $n_s$ mod 2 is 0; k' is 9, l' is 5 and $n_s$ mod 2 is 0; k' is 8, l' is 5 and $n_s$ mod 2 is 0; k' is 3, l' is 5 and $n_s$ mod 2 is 0; k' is 2, l' is 5 and $n_s$ mod 2 is 0; k' is 9, l' is 2 and $n_s$ mod 2 is 1; k' is 8, l' is 2 and $n_s$ mod 2 is 1; k is 3, l' is 2 and $n_s$ mod 2 is 1; and k' is 2, l' is 2 and $n_s$ mod 2 is 1.

The 10 4-port CSI-RS configuration parameters include the following parameters: k is 9, l' is 2 and $n_s$ mod 2 is 0; k' is 8, l' is 2 and $n_s$ mod 2 is 0; k is 11, l' is 5 and $n_s$ mod 2 is 0; k' is 10, l' is 5 and $n_s$ mod 2 is 0; k' is 7, l' is 5 and $n_s$ mod 2 is 0; k' is 6, l' is 5 and $n_s$ mod 2 is 0; k is 5, l' is 5 and $n_s$ mod 2 is 0; k' is 8, l' is 5 and $n_s$ mod 2 is 0; k' is 9, l' is 2 and $n_s$ mod 2 is 1; and k' is 8, l' is 2 and $n_s$ mod 2 is 1.

The 5 8-port CSI-RS configuration parameters include the following parameters: k is 9, l' is 2 and $n_s$ mod 2 is 0; k' is 11, l' is 5 and $n_s$ mod 2 is 0; k' is 7, l' is 5 and $n_s$ mod 2 is 0; k' is 9, l' is 5 and $n_s$ mod 2 is 0; and k' is 9, l' is 2 and $n_s$ mod 2 is 1.

Where, a location of an RE occupied by the CSI-RS in a PRB pair is represented by (k', l') k' represents a row where the RE is located, l' represents a column where the RE is located, $n_s$ represents a slot number, each subframe includes two slots, and mod represents remainder calculation.

Herein, during a practical application, according to the CSI-RS pattern shown in FIG. 4 and FIG. 5, a base station side selects the CSI-RS pattern in FIG. 4 or FIG. 5 for CSI-RS transmission according to a configuration of the special slot, k' being numbered to be 0~11 from bottom to top respectively and numbers of l' being 0~6.

On the basis of the abovementioned conditions, the CSI-RS configuration parameter indication table shown in Table 2 is formed.

TABLE 2

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| CSI-RS in DwPTS 0 | (9, 2) | 0 | (9, 2) | 0 | (9, 2) | 0 |
| 1 | (8, 2) | 0 | (8, 2) | 0 | (11, 5) | 0 |
| 2 | (3, 2) | 0 | (11, 5) | 0 | (7, 5) | 0 |
| 3 | (2, 2) | 0 | (10, 5) | 0 | | |

TABLE 2-continued

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 4 | (11, 5) | 0 | (7, 5) | 0 | | |
| 5 | (10, 5) | 0 | (6, 5) | 0 | | |
| 6 | (7, 5) | 0 | | | | |
| 7 | (6, 5) | 0 | | | | |
| 8 | (5, 5) | 0 | | | | |
| 9 | (4, 5) | 0 | | | | |
| 10 | (1, 5) | 0 | | | | |
| 11 | (0, 5) | 0 | | | | |
| 12 | (9, 5) | 0 | (9, 5) | 0 | (9, 5) | 0 |
| 13 | (8, 5) | 0 | (8, 5) | 0 | (9, 2) | 1 |
| 14 | (3, 5) | 0 | (9, 2) | 1 | | |
| 15 | (2, 5) | 0 | (8, 2) | 1 | | |
| 16 | (9, 2) | 1 | | | | |
| 17 | (8, 2) | 1 | | | | |
| 18 | (3, 2) | 1 | | | | |
| 19 | (2, 2) | 1 | | | | |

It should be noted that, during a practical application, serial numbers 0~19 in Table 2 are not limited.

When the second field is resourceConfig-r12, resourceConfig-r11 or resourceConfig-r10, the second field has a value up to 20; and when the second field is resourceConfigList-r11, resourceConfigList-r11 has a value up to 10, and may indicate multiple 4-port and 8-port CSI-RS configuration parameters. At this point, the CSI-RS configuration corresponding to 1 or 2 antenna ports is not included.

In addition, during a practical application, for further reducing modification to the standard, namely reducing modification to the RRC signaling, a certain offset (3 or 4 symbols) is added to the related CSI-RS pattern (for example, the CSI-RS patterns shown in FIG. 2 and FIG. 3) to acquire the CSI-RS pattern in the special slot.

On such a basis, the operation that the second field in the RRC signaling is configured to indicate the CSI-RS pattern in the special slot specifically includes that:

the second field is configured to indicate a corresponding relationship between a default CSI-RS pattern and a CSI-RS pattern in the special slot, the corresponding relationship including a corresponding relationship between l' and $n_s$ mod 2, where, when l' in the default CSI-RS pattern is more than 3, l' in the CSI-RS pattern in the special slot is a difference between l' in the default CSI-RS pattern and 3;

when l' in the default CSI-RS pattern is less than or equal to 3, l' in the CSI-RS pattern in the special slot is a remainder obtained through dividing, by 7, a sum of l' in the default CSI-RS pattern and 10;

when l' in the default CSI-RS pattern is more than 3 and $n_s$ mod 2 in the default CSI-RS pattern is equal to 1, $n_s$ mod 2 in the CSI-RS pattern in the special slot is 1; and except when l' in the default CSI-RS pattern is more than 3 and $n_s$ mod 2 in the default CSI-RS pattern is equal to 1, $n_s$ mod 2 in the CSI-RS pattern in the special slot is 0.

Where, when a formula is adopted to represent the corresponding relationship and the CSI-RS pattern in the special slot:

$$l'_{DwPTS} = \begin{cases} l' - 3, & \text{if } l' > 3 \\ (l' + 10) \bmod 7, & \text{else} \end{cases}$$

-continued $$(n_s \bmod 2)_{DwPTS} = \begin{cases} 1, & \text{if } l' > 3 \text{ and } n_s \bmod 2 = 1 \\ 0, & \text{else} \end{cases}.$$

Here, $l'_{DwPTS}$ represents l' in the CSI-RS pattern in the special slot, $(n_s \bmod 2)_{DwPTS}$ represents $n_s$ mod 2 in the CSI-RS pattern in the special slot, l' represents l' in the default CSI-RS pattern, and $n_s$ mod 2 represents $n_s$ mod 2 in the default CSI-RS pattern.

The default CSI-RS pattern refers to a CSI-RS pattern (as shown in FIG. 2 and FIG. 3) in the related standard (the 3GPP R12 standard).

Besides the corresponding relationship adopted to represent the CSI-RS pattern in the configured special slot, an OFDM symbol offset manner may also be adopted for representation.

On such a basis, the operation that the second field in the RRC signaling is configured to indicate the CSI-RS pattern in the special slot specifically includes that:

a CSI-RS configuration in the special slot is generated according to an offset of the CSI-RS pattern in the special slot from the default CSI-RS pattern, where, when l' in the default CSI-RS pattern is more than 3, the CSI-RS pattern in the special slot is obtained by shifting the default CSI-RS pattern leftwards by 3 OFDM symbols;

when l' in the default CSI-RS pattern is less than or equal to 3, the CSI-RS pattern in the special slot is obtained by shifting l' in the default CSI-RS pattern leftwards by 4 OFDM symbols; and the location of the RE occupied by the CSI-RS in the PRB pair is represented by (k', l') k' represents the row where the RE is located, each row is a subcarrier, l' represents the column where the RE is located, and each column is an OFDM symbol.

Figure 7:
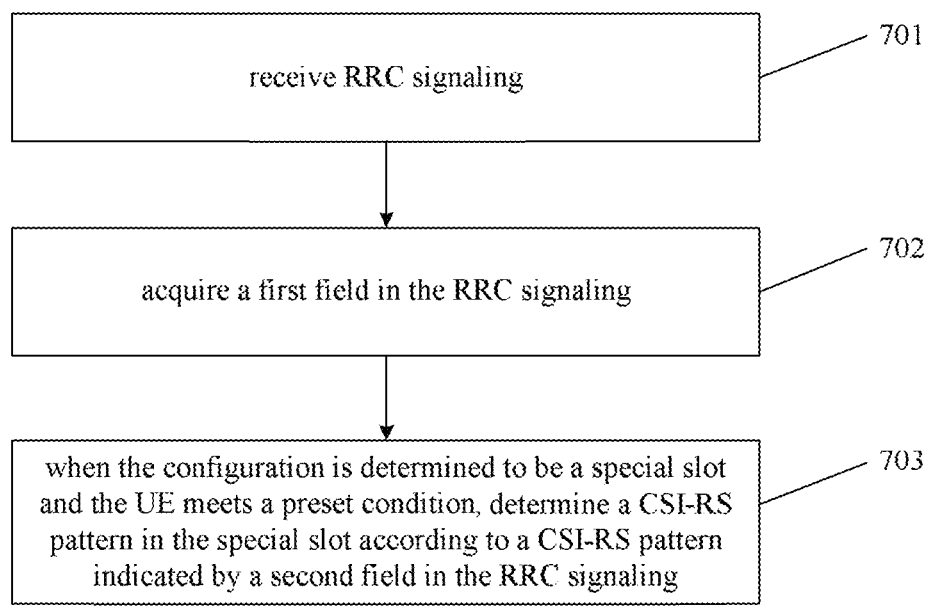
FIG. 7 is a flowchart of a CSI-RS indication method for a UE side according to some embodiments of the disclosure.

The embodiments further provide a CSI-RS indication method, which is applied to UE. As shown in FIG. 7, the method includes the following steps.

In 701, when a CSI-RS is transmitted through a DwPTS, RRC signaling that indicates a CSI-RS resource configuration is received.

In 702, a first field in the RRC signaling is acquired.

In 703, when the first field is determined to indicate a special slot and the UE meets a preset condition, a CSI-RS pattern in the special slot is determined according to a CSI-RS pattern indicated by a second field in the RRC signaling.

Here, the first field indicates a CSI-RS subframe configuration, and the second field indicates a CSI-RS configuration.

During a practical application, for different protocol versions, values of the first field and the second field may also be different, specifically as follows:

for the 3GPP R12, the first field is subframeConfig-r12, and the second field is resourceConfig-r12;

for the 3GPP R11, the first field is subframeConfig-r11, and the second field is resourceConfig-r11 or resourceConfigList-r11; and for the 3GPP R10, the first field may be subframeConfig-r10, and the second field may be resourceConfig-r10.

The preset condition refers to that the UE is new UE, rather than conventional UE (legacy UE).

Where, the conventional UE refers to UE meeting the 3GPP R12 (namely meeting the 3GPP R12 standard) and versions before the 3GPP R12; and correspondingly, the new UE refers to UE meeting the 3GPP R13 (meeting the 3GPP R13 standard).

During a practical application, when the conventional UE receives the RRC signaling and it is determined that the first field in the RRC signaling indicates the special slot, mistaken transmission is determined.

In the embodiments, when a CSI-RS configuration parameter indication table is adopted, the operation that the CSI-RS pattern in the special slot is determined according to the CSI-RS pattern indicated by the second field in the RRC signaling specifically includes that:

a serial number corresponding to the CSI-RS pattern in the special slot indicated by the second field is acquired in a CSI-RS configuration parameter indication table; and the CSI-RS pattern in the special slot is determined according to an acquired number of CSI-RS ports and the serial number, the CSI-RS configuration parameter indication table including 20 1-port CSI-RS configuration parameters, 20 2-port CSI-RS configuration parameters, 10 4-port CSI-RS configuration parameters and 5 8-port CSI-RS configuration parameters, where the 20 1-port CSI-RS configuration parameters are the same as the 20 2-port CSI-RS configuration parameters.

Here, the 20 1-port or 2-port CSI-RS configuration parameters include the following parameters: k' is 9, l' is 2 and $n_s$ mod 2 is 0; k' is 8, l' is 2 and $n_s$ mod 2 is 0; k' is 3, l' is 2 and $n_s$ mod 2 is 0; k' is 2, l' is 2 and $n_s$ mod 2 is 0; k' is 11, l' is 5 and $n_s$ mod 2 is 0; k is 10, l' is 5 and $n_s$ mod 2 is 0; k' is 7, l' is 5 and $n_s$ mod 2 is 0; k' is 6, l' is 5 and $n_s$ mod 2 is 0; k' is 5, l' is 5 and $n_s$ mod 2 is 0; k' is 4, l' is 5 and $n_s$ mod 2 is 0; k' is 1, l' is 5 and $n_s$ mod 2 is 0; k' is 0, l' is 5 and $n_s$ mod 2 is 0; k' is 9, l' is 5 and $n_s$ mod 2 is 0; k' is 8, l' is 5 and $n_s$ mod 2 is 0; k' is 3, l' is 5 and $n_s$ mod 2 is 0; k' is 2, l' is 5 and $n_s$ mod 2 is 0; k' is 9, l' is 2 and $n_s$ mod 2 is 1; k' is 8, l' is 2 and $n_s$ mod 2 is 1; k' is 3, l' is 2 and $n_s$ mod 2 is 1; and k' is 2, l' is 2 and $n_s$ mod 2 is 1.

The 10 4-port CSI-RS configuration parameters include the following parameters: k is 9, l' is 2 and $n_s$ mod 2 is 0; k' is 8, l' is 2 and $n_s$ mod 2 is 0; k is 11, l' is 5 and $n_s$ mod 2 is 0; k' is 10, l' is 5 and $n_s$ mod 2 is 0; k' is 7, l' is 5 and $n_s$ mod 2 is 0; k' is 6, l' is 5 and $n_s$ mod 2 is 0; k is 5, l' is 5 and $n_s$ mod 2 is 0; k' is 9, l' is 2 and $n_s$ mod 2 is 1; and k' is 8, l' is 2 and $n_s$ mod 2 is 1.

The 5 8-port CSI-RS configuration parameters include the following parameters: k' is 9, l' is 2 and $n_s$ mod 2 is 0; k' is 11, l' is 5 and $n_s$ mod 2 is 0; k' is 7, l' is 5 and $n_s$ mod 2 is 0; k' is 9, l' is 5 and $n_s$ mod 2 is 0; and k' is 9, l' is 2 and $n_s$ mod 2 is 1.

Where, a location of an RE occupied by the CSI-RS in a PRB pair is represented by (k', l') k' represents a row where the RE is located, l' represents a column where the RE is located, $n_s$ represents a slot number, each subframe includes two slots, and mod represents remainder calculation.

Herein, during a practical application, according to the CSI-RS pattern shown in FIG. 4 and FIG. 5, k' is numbered to be 0~11 from bottom to top respectively and numbers of l' are 0~6.

On the basis of the abovementioned conditions, the CSI-RS configuration parameter indication table shown in Table 2 is formed.

when the second field is resourceConfig-r12, resourceConfig-r11 or resourceConfig-r10, the second field has a value up to 20; and when the second field is resourceConfigList-r11, resourceConfigList-r11 has a value up to 10, and may indicate multiple 4-port and 8-port CSI-RS configuration parameters. At this point, the CSI-RS configuration corresponding to 1 or 2 antenna ports is not included.

In addition, during a practical application, for further reducing modification to the standard, namely reducing modification to the RRC signaling, a certain offset (3 or 4 symbols) is added to the related CSI-RS pattern (for example, the CSI-RS patterns shown in FIG. 2 and FIG. 3) to acquire the CSI-RS pattern in the special slot.

On such a basis, the operation that the CSI-RS pattern in the special slot is determined according to the CSI-RS pattern indicated by the second field in the RRC signaling specifically includes that:

a corresponding relationship, indicated by the second field, between a default CSI-RS pattern and a CSI-RS pattern in the special slot is acquired, the corresponding relationship including a corresponding relationship between l' and $n_s$ mod 2; and the CSI-RS pattern in the special slot is determined according to the corresponding relationship and the default CSI-RS pattern, where the operation that the CSI-RS pattern in the special slot is determined according to the corresponding relationship and the default CSI-RS pattern includes that:

when l' in the default CSI-RS pattern is more than 3, a difference between l' in the default CSI-RS pattern and 3 is calculated to obtain l' in the CSI-RS pattern in the special slot;

when l' in the default CSI-RS pattern is less than or equal to 3, l' in the CSI-RS pattern in the special slot is determined to be a remainder obtained through dividing, by 7, a sum of l in the default CSI-RS pattern and 10, i.e. (l+10)mod 7;

when l' in the default CSI-RS pattern is more than 3 and $n_s$ mod 2 in the default CSI-RS pattern is equal to 1, $n_s$ mod 2 in the CSI-RS pattern in the special slot is determined to be 1; and except when l' in the default CSI-RS pattern is more than 3 and $n_s$ mod 2 in the default CSI-RS pattern is equal to 1, $n_s$ mod 2 in the CSI-RS pattern in the special slot is determined to be 0.

Where, when a formula is adopted to represent the corresponding relationship and the CSI-RS pattern in the special slot:

$$l'_{DwPTS} = \begin{cases} l' - 3, & \text{if } l' > 3 \\ (l' + 10)\bmod 7, & \text{else} \end{cases}$$

-continued $$(n_s \bmod 2)_{DwPTS} = \begin{cases} 1, & \text{if } l' > 3 \text{ and } n_s \bmod 2 = 1 \\ 0, & \text{else} \end{cases}.$$

Here, $l'_{DwPTS}$ represents l' in the CSI-RS pattern in the special slot, $(n_s \bmod 2)_{DwPTS}$ represents $n_s \bmod 2$ in the CSI-RS pattern in the special slot, l' represents l' in the default CSI-RS pattern, and $n_s \bmod 2$ represents $n_s \bmod 2$ in the default CSI-RS pattern.

The default CSI-RS pattern refers to a CSI-RS pattern (as shown in FIG. 2 and FIG. 3) in the related standard (the 3GPP R12 standard).

Besides the corresponding relationship adopted to represent the CSI-RS pattern in the configured special slot, an OFDM symbol offset manner may also be adopted for representation.

The operation that the CSI-RS pattern in the special slot is determined according to the CSI-RS pattern indicated by the second field in the RRC signaling includes that:

a CSI-RS configuration in the special slot indicated by the second field is acquired, where the CSI-RS configuration in the special slot is generated according to an offset of the CSI-RS pattern in the special slot from the default CSI-RS pattern; and the CSI-RS pattern in the special slot is determined according to the configuration and the default CSI-RS pattern, where, when l' in the default CSI-RS pattern is more than 3, the CSI-RS pattern in the special slot is obtained by shifting the default CSI-RS pattern leftwards by 3 OFDM symbols;

when l' in the default CSI-RS pattern is less than or equal to 3, the CSI-RS pattern in the special slot is obtained by shifting l' in the default CSI-RS pattern leftwards by 4 OFDM symbols; and the location of the RE occupied by the CSI-RS in the PRB pair is represented by (k', l') k' represents the row where the RE is located, each row is a subcarrier, represents the column where the RE is located, and each column is an OFDM symbol.

Figure 8:
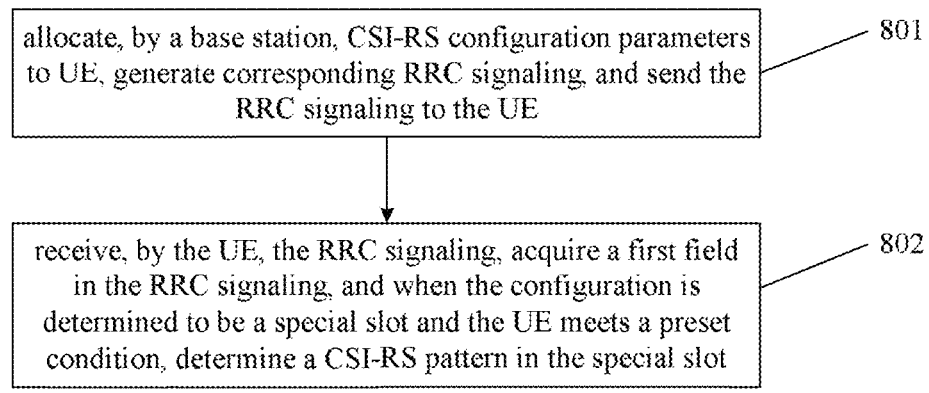
FIG. 8 is a flowchart of a CSI-RS indication method according to some embodiments of the disclosure.

The embodiments further provide a CSI-RS indication method. As shown in FIG. 8, the method includes the following steps.

In 801, when a CSI-RS is transmitted through a DwPTS, a base station allocates CSI-RS configuration parameters to UE, generates RRC signaling that indicates a CSI-RS resource configuration according to information about the CSI-RS configuration parameters allocated to the UE, and sends the RRC signaling to the UE.

Where, when the RRC signaling that indicates the CSI-RS resource configuration is generated, a subframeConfig-r11 field in the RRC signaling is configured to indicate a special slot, and a resourceConfig-r11 field in the RRC signaling is configured to indicate a CSI-RS pattern in the special slot.

In 802, the UE receives the RRC signaling, acquires the subframeConfig-r11 field in the RRC signaling, and when a configuration of the subframeConfig-r11 field is determined to be the special slot and the UE meets a preset condition, determines the CSI-RS pattern in the special slot according to the CSI-RS pattern indicated by the resourceConfig-r11 field in the RRC signaling.

Here, the first field indicates a CSI-RS subframe configuration, and the second field indicates a CSI-RS configuration.

It should be noted that specific processing processes of the base station and the UE have been described above in detail and will not be elaborated herein.

According to the CSI-RS indication method provided by the embodiments, when the CSI-RS is transmitted through the DwPTS, the base station generates the RRC signaling that indicates the CSI-RS resource configuration, and sends the RRC signaling to the UE, where, when the RRC signaling that indicates the CSI-RS resource configuration is generated, the subframeConfig-r11 field in the RRC signaling is configured to indicate the special slot, and the resourceConfig-r11 field in the RRC signaling is configured to indicate the CSI-RS pattern in the special slot; and the UE receives the RRC signaling, acquires the first field in the RRC signaling, and when the first field is determined to indicate the special slot and the UE meets the preset condition, determines the CSI-RS pattern in the special slot according to the CSI-RS pattern indicated by the second field in the RRC signaling, the first field indicating the CSI-RS subframe configuration and the second field indicating the CSI-RS configuration. Only a CSI-RS chapter in the 36211 standard is required to be modified, that is, the configuration in the DwPTS is added, the configuration information may be described in three forms of a new table, a formula and an offset, the 36331 standard is not modified, and the new UE utilizes the related RRC signaling for re-reading. Therefore, the related RRC signaling is not required to be modified, and a signaling overhead is greatly reduced.

Figure 9:
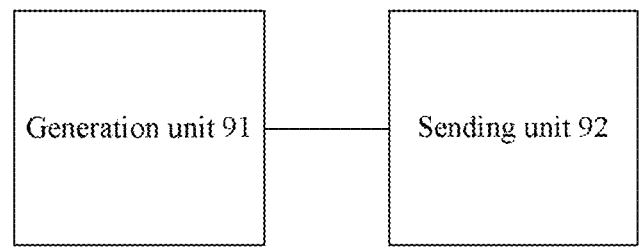
FIG. 9 is a structure diagram of a base station according to some embodiments of the disclosure.

In the embodiments, for implementing the method of the embodiments of the disclosure, the embodiments provide a base station. As shown in FIG. 9, the base station includes: a generation unit 91 and a sending unit 92, where the generation unit 91 is configured to generate RRC signaling that indicates a CSI-RS resource configuration according to information about CSI-RS configuration parameters allocated to UE; and the sending unit 92 is configured to send the RRC signaling to the UE, where, when the RRC signaling that indicates the CSI-RS resource configuration is generated, the generation unit 91 configures a first field in the RRC signaling to indicate a special slot and configures a second field in the RRC signaling to indicate a CSI-RS pattern in the special slot; and the configured special slot is configured to indicate the UE meeting a preset condition to acquire the CSI-RS pattern indicated by the second field.

Here, during a practical application, the base station further includes an allocation unit, configured to, when a CSI-RS is transmitted through a DwPTS, allocate the CSI-RS configuration parameters to the UE; and correspondingly, the generation unit 91 is configured to generate the RRC signaling that indicates the CSI-RS resource configuration according to the information about the CSI-RS configuration parameters allocated to the UE.

The first field and the second field may adopt related fields in the 3GPP R12 standard.

During a practical application, for different protocol versions, values of the first field and the second field may also be different, specifically as follows:

for the 3GPP R12, the first field is subframeConfig-r12, and the second field is resourceConfig-r12;

for the 3GPP R11, the first field is subframeConfig-r11, and the second field is resourceConfig-r11 or resourceConfigList-r11; and for the 3GPP R10, the first field may be subframeConfig-r10, and the second field may be resourceConfig-r10.

The preset condition refers to that the UE is new UE, rather than conventional UE (legacy UE).

Where, the conventional UE refers to UE meeting the 3GPP R12 (namely meeting the 3GPP R12 standard) and versions before the 3GPP R12; and correspondingly, the new UE refers to UE meeting the 3GPP R13 (meeting the 3GPP R13 standard).

During a practical application, when the conventional UE receives the RRC signaling and it is determined that the first field in the RRC signaling indicates the special slot, mistaken transmission is determined.

When a CSI-RS configuration parameter indication table is adopted, the generation unit 91 is specifically configured to configure the second field to be a serial number corresponding to the CSI-RS pattern in the special slot in the CSI-RS configuration parameter table; and the CSI-RS configuration parameter indication table includes 20 1-port CSI-RS configuration parameters, 20 2-port CSI-RS configuration parameters, 10 4-port CSI-RS configuration parameters and 5 8-port CSI-RS configuration parameters, where the 20 1-port CSI-RS configuration parameters are the same as the 20 2-port CSI-RS configuration parameters.

Here, the 20 1-port or 2-port CSI-RS configuration parameters include the following parameters: k' is 9, l' is 2 and $n_s$ mod 2 is 0; k' is 8, l' is 2 and $n_s$ mod 2 is 0; k' is 3, l' is 2 and $n_s$ mod 2 is 0; k' is 2, l' is 2 and $n_s$ mod 2 is 0; k' is 11, l' is 5 and $n_s$ mod 2 is 0; k' is 10, l' is 5 and $n_s$ mod 2 is 0; k' is 7, l' is 5 and $n_s$ mod 2 is 0; k' is 6, l' is 5 and $n_s$ mod 2 is 0; k' is 5, l' is 5 and $n_s$ mod 2 is 0; k' is 4, l' is 5 and $n_s$ mod 2 is 0; k' is 1, l' is 5 and $n_s$ mod 2 is 0; k is 0, l' is 5 and $n_s$ mod 2 is 0; k' is 9, l' is 5 and $n_s$ mod 2 is 0; k' is 8, l' is 5 and $n_s$ mod 2 is 0; k' is 3, l' is 5 and $n_s$ mod 2 is 0; k' is 2, l' is 5 and $n_s$ mod 2 is 0; k' is 9, l' is 2 and $n_s$ mod 2 is 1; k' is 8, l' is 2 and $n_s$ mod 2 is 1; k' is 3, l' is 2 and $n_s$ mod 2 is 1; and k' is 2, l' is 2 and $n_s$ mod 2 is 1.

The 10 4-port CSI-RS configuration parameters include the following parameters: k is 9, l' is 2 and $n_s$ mod 2 is 0; k' is 8, l' is 2 and $n_s$ mod 2 is 0; k is 11, l' is 5 and $n_s$ mod 2 is 0; k' is 10, l' is 5 and $n_s$ mod 2 is 0; k' is 7, l' is 5 and $n_s$ mod 2 is 0; k' is 6, l' is 5 and $n_s$ mod 2 is 0; k is 5, l' is 5 and $n_s$ mod 2 is 0; k' is 8, l' is 5 and $n_s$ mod 2 is 0; k' is 9, l' is 2 and $n_s$ mod 2 is 1; and k' is 8, l' is 2 and $n_s$ mod 2 is 1.

The 5 8-port CSI-RS configuration parameters include the following parameters: k is 9, l' is 2 and $n_s$ mod 2 is 0; k' is 11, l' is 5 and $n_s$ mod 2 is 0; k' is 7, l' is 5 and $n_s$ mod 2 is 0; k' is 9, l' is 5 and $n_s$ mod 2 is 0; and k' is 9, l' is 2 and $n_s$ mod 2 is 1.

Where, a location of an RE occupied by the CSI-RS in a PRBpair is represented by (k', l') k' represents a row where the RE is located, l' represents a column where the RE is located, $n_s$ represents a slot number, each subframe includes two slots, and mod represents remainder calculation.

Herein, during a practical application, according to the CSI-RS pattern shown in FIG. 4 and FIG. 5, k is numbered to be 0~11 from bottom to top respectively and numbers of l' are 0~6.

On the basis of the abovementioned conditions, the CSI-RS configuration parameter indication table shown in Table 2 is formed.

When the second field is resourceConfig-r12, resourceConfig-r11 or resourceConfig-r10, the second field has a value up to 20; and when the second field is resourceConfigList-r11, resourceConfigList-r11 has a value up to 10, and may indicate multiple 4-port and 8-port CSI-RS configuration parameters. At this point, the CSI-RS configuration corresponding to 1 or 2 antenna ports is not included.

In addition, during a practical application, for further reducing modification to the standard, namely reducing modification to the RRC signaling, a certain offset (3 or 4 symbols) is added to the related CSI-RS pattern (for example, the CSI-RS patterns shown in FIG. 2 and FIG. 3) to acquire the CSI-RS pattern in the special slot.

On such a basis, the generation unit 91 is specifically configured to configure the second field to indicate a corresponding relationship between a default CSI-RS pattern and a CSI-RS pattern in the special slot, the corresponding relationship including a corresponding relationship between l' and $n_s$ mod 2, where, when l' in the default CSI-RS pattern is more than 3, l' in the CSI-RS pattern in the special slot is a difference between l' in the default CSI-RS pattern and 3;

when l' in the default CSI-RS pattern is less than or equal to 3, l' in the CSI-RS pattern in the special slot is a remainder obtained through dividing, by 7, a sum of l' in the default CSI-RS pattern and 10, i.e. (l+10)mod 7;

when l' in the default CSI-RS pattern is more than 3 and $n_s$ mod 2 in the default CSI-RS pattern is equal to 1, $n_s$ mod 2 in the CSI-RS pattern in the special slot is 1;

except when l' in the default CSI-RS pattern is more than 3 and $n_s$ mod 2 in the default CSI-RS pattern is equal to 1, $n_s$ mod 2 in the CSI-RS pattern in the special slot is 0; and the location of the RE occupied by the CSI-RS in the PRB pair is represented by (k', l') k' represents the row where the RE is located, l' represents the column where the RE is located, and $n_s$ represents the slot number.

Where, when a formula is adopted to represent the corresponding relationship and the CSI-RS pattern in the special slot:

$$l'_{DwPTS} = \begin{cases} l' - 3, & \text{if } l' > 3 \\ (l' + 10)\text{mod}7, & \text{else} \end{cases}$$

$$(n_s\text{mod}2)_{DwPTS} = \begin{cases} 1, & \text{if } l' > 3 \text{ and } n_s\text{mod}2 = 1 \\ 0, & \text{else} \end{cases}.$$

Here, $l'_{DwPTS}$ represents l' in the CSI-RS pattern in the special slot, $(n_s \text{ mod } 2)_{DwPTS}$ represents $n_s$ mod 2 in the CSI-RS pattern in the special slot, l' represents l' in the default CSI-RS pattern, and $n_s$ mod 2 represents $n_s$ mod 2 in the default CSI-RS pattern.

The default CSI-RS pattern refers to a CSI-RS pattern (as shown in FIG. 2 and FIG. 3) in the related standard (the 3GPP R12 standard).

Besides the corresponding relationship adopted to represent the CSI-RS pattern in the configured special slot, an OFDM symbol offset manner may also be adopted for representation.

On such a basis, the generation unit 91 is specifically configured to generate a CSI-RS configuration in the special slot according to an offset of the CSI-RS pattern in the special slot from the default CSI-RS pattern, where, when l' in the default CSI-RS pattern is more than 3, the CSI-RS pattern in the special slot is obtained by shifting the default CSI-RS pattern leftwards by 3 OFDM symbols;

when l' in the default CSI-RS pattern is less than or equal to 3, the CSI-RS pattern in the special slot is obtained by shifting l' in the default CSI-RS pattern leftwards by 4 OFDM symbols; and the location of the RE occupied by the CSI-RS in the PRB pair is represented by (k', l') k' represents the line where the RE is located, each row is a subcarrier, represents the column where the RE is located, and each column is an OFDM symbol.

During a practical application, the allocation unit and the generation unit 91 may be implemented by a Central Processing Unit (CPU), Micro Control Unit (MCU), Digital Signal Processor (DSP) or Field Programmable Gate Array (FPGA) in the base station; and the sending unit 92 may be implemented in a transmitter in the base station.

Figure 10:
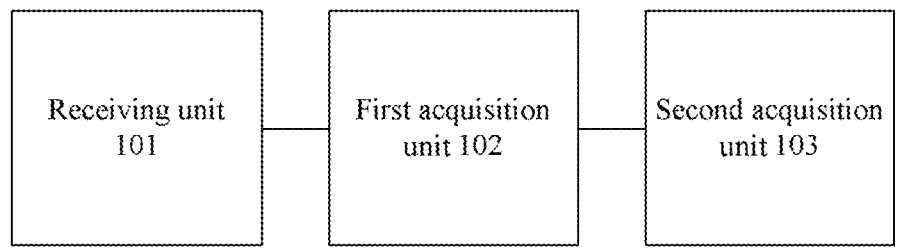
FIG. 10 is a structure diagram of UE according to some embodiments of the disclosure.

For implementing the method of the embodiments of the disclosure, the embodiments further provide UE. As shown in FIG. 10, the UE includes: a receiving unit 101, a first acquisition unit 102 and a second acquisition unit 103, where the receiving unit 101 is configured to, when a CSI-RS is transmitted through a DwPTS, receive RRC signaling that indicates a CSI-RS resource configuration;

the first acquisition unit 102 is configured to acquire a first field in the RRC signaling; and the second acquisition unit 103 is configured to, when the first field is determined to indicate a special slot and the UE meets a preset condition, determine a CSI-RS pattern in the special slot according to a CSI-RS pattern indicated by a second field in the RRC signaling.

Here, the first field indicates a CSI-RS subframe configuration, and the second field indicates a CSI-RS configuration.

During a practical application, for different protocol versions, values of the first field and the second field may also be different, specifically as follows:

for the 3GPP R12, the first field is subframeConfig-r12, and the second field is resourceConfig-r12;

for the 3GPP R11, the first field is subframeConfig-r11, and the second field is resourceConfig-r11 or resourceConfigList-r11; and for the 3GPP R10, the first field may be subframeConfig-r10, and the second field may be resourceConfig-r10.

The preset condition refers to that the UE is new UE, rather than conventional UE (legacy UE).

Where, the conventional UE refers to UE meeting the 3GPP R12 (namely meeting the 3GPP R12 standard) and versions before the 3GPP R12; and correspondingly, the new UE refers to UE meeting the 3GPP R13 (meeting the 3GPP R13 standard).

During a practical application, when the conventional UE receives the RRC signaling and it is determined that the first field in the RRC signaling indicates the special slot, mistaken transmission is determined.

In the embodiments, when a CSI-RS configuration parameter indication table is adopted, the second acquisition unit 103 is specifically configured to acquire, in a CSI-RS configuration parameter indication table, a serial number corresponding to the CSI-RS pattern in the special slot indicated by the second field, and determine the CSI-RS pattern in the special slot according to an acquired number of CSI-RS ports and the serial number, the CSI-RS configuration parameter indication table including 20 1-port CSI-RS configuration parameters, 20 2-port CSI-RS configuration parameters, 10 4-port CSI-RS configuration parameters and 5 8-port CSI-RS configuration parameters, where the 20 1-port CSI-RS configuration parameters are the same as the 20 2-port CSI-RS configuration parameters.

Here, the 20 1-port or 2-port CSI-RS configuration parameters include the following parameters: k is 9, l' is 2 and $n_s$ mod 2 is 0; k is 8, l' is 2 and $n_s$ mod 2 is 0; k' is 3, l' is 2 and $n_s$ mod 2 is 0; k' is 2, l' is 2 and $n_s$ mod 2 is 0; k' is 11, l' is 5 and $n_s$ mod 2 is 0; k' is 10, l' is 5 and $n_s$ mod 2 is 0; k' is 7, l' is 5 and $n_s$ mod 2 is 0; k' is 6, l' is 5 and $n_s$ mod 2 is 0; k' is 5, l' is 5 and $n_s$ mod 2 is 0; k' is 4, l' is 5 and $n_s$ mod 2 is 0; k' is 1, l' is 5 and $n_s$ mod 2 is 0; k' is 0, l' is 5 and $n_s$ mod 2 is 0; k' is 9, l' is 5 and $n_s$ mod 2 is 0; k' is 8, l' is 5 and $n_s$ mod 2 is 0; k' is 3, l' is 5 and $n_s$ mod 2 is 0; k' is 2, l' is 5 and $n_s$ mod 2 is 0; k' is 9, l' is 2 and $n_s$ mod 2 is 1; k' is 8, l' is 2 and $n_s$ mod 2 is 1; k' is 3, l' is 2 and $n_s$ mod 2 is 1; and k' is 2, l' is 2 and $n_s$ mod 2 is 1.

The 10 4-port CSI-RS configuration parameters include the following parameters: k is 9, l' is 2 and $n_s$ mod 2 is 0; k' is 8, l' is 2 and $n_s$ mod 2 is 0; k' is 11, l' is 5 and $n_s$ mod 2 is 0; k' is 10, l' is 5 and $n_s$ mod 2 is 0; k' is 7, l' is 5 and $n_s$ mod 2 is 0; k' is 6, l' is 5 and $n_s$ mod 2 is 0; k' is 5, l' is 5 and $n_s$ mod 2 is 0; k' is 8, l' is 5 and $n_s$ mod 2 is 0; k is 9, l' is 2 and $n_s$ mod 2 is 1; and k' is 8, l' is 2 and $n_s$ mod 2 is 1.

The 5 8-port CSI-RS configuration parameters include the following parameters: k' is 9, l' is 2 and $n_s$ mod 2 is 0; k' is 11, l' is 5 and $n_s$ mod 2 is 0; k' is 7, l' is 5 and $n_s$ mod 2 is 0; k' is 9, l' is 5 and $n_s$ mod 2 is 0; and k' is 9, l' is 2 and $n_s$ mod 2 is 1.

Where, a location of an RE occupied by the CSI-RS in a PRBpair is represented by (k', l') k' represents a row where the RE is located, l' represents a column where the RE is located, $n_s$ represents a slot number, each subframe includes two slots, and mod represents remainder calculation.

Herein, during a practical application, according to the CSI-RS pattern shown in FIG. 4 and FIG. 5, k is numbered to be 0~11 from bottom to top respectively and numbers of l' are 0~6.

On the basis of the abovementioned conditions, the CSI-RS configuration parameter indication table shown in Table 2 is formed.

When the second field is resourceConfig-r12, resourceConfig-r11 or resourceConfig-r10, the second field has a value up to 20; and when the second field is resourceConfigList-r11, resourceConfigList-r11 has a value up to 10, and may indicate multiple 4-port and 8-port CSI-RS configuration parameters. At this point, the CSI-RS configuration corresponding to 1 or 2 antenna ports is not included.

In addition, during a practical application, for further reducing modification to the standard, namely reducing modification to the RRC signaling, a certain offset (3 or 4 symbols) is added to the related CSI-RS pattern (for example, the CSI-RS patterns shown in FIG. 2 and FIG. 3) to acquire the CSI-RS pattern in the special slot.

On such a basis, the second acquisition unit 103 is specifically configured to:

acquire a corresponding relationship, indicated by the second field, between a default CSI-RS pattern and a CSI-RS pattern in the special slot, the corresponding relationship including a corresponding relationship between l' and $n_s$ mod 2, and determine the CSI-RS pattern in the special slot according to the corresponding relationship and the default CSI-RS pattern, where the operation that the CSI-RS pattern in the special slot is determined according to the corresponding relationship and the default CSI-RS pattern includes that:

when l' in the default CSI-RS pattern is more than 3, a difference between l' in the default CSI-RS pattern and 3 is calculated to obtain l' in the CSI-RS pattern in the special slot;

when l' in the default CSI-RS pattern is less than or equal to 3, l' in the CSI-RS pattern in the special slot is determined to be a remainder obtained through dividing, by 7, a sum of 1 in the default CSI-RS pattern and 10, i.e. (1+10)mod 7;

when l' in the default CSI-RS pattern is more than 3 and $n_s$ mod 2 in the default CSI-RS pattern is equal to 1, $n_s$ mod 2 in the CSI-RS pattern in the special slot is determined to be 1; and except when l' in the default CSI-RS pattern is more than 3 and $n_s$ mod 2 in the default CSI-RS pattern is equal to 1, $n_s$ mod 2 in the CSI-RS pattern in the special slot is determined to be 0.

Where, when a formula is adopted to represent the corresponding relationship and the CSI-RS pattern in the special slot:

$$l'_{DwPTS} = \begin{cases} l' - 3, & \text{if } l' > 3 \\ (l' + 10)\text{mod} 7, & \text{else} \end{cases}$$

$$(n_s \text{mod} 2)_{DwPTS} = \begin{cases} 1, & \text{if } l' > 3 \text{ and } n_s \text{mod} 2 = 1 \\ 0, & \text{else} \end{cases}.$$

Here, $l'_{DwPTS}$ represents l' in the CSI-RS pattern in the special slot, $(n_s \text{ mod } 2)_{DwPTS}$ represents $n_s$ mod 2 in the CSI-RS pattern in the special slot, l' represents l' in the default CSI-RS pattern, and $n_s$ mod 2 represents $n_s$ mod 2 in the default CSI-RS pattern.

The default CSI-RS pattern refers to a CSI-RS pattern (as shown in FIG. 2 and FIG. 3) in the related standard (the 3GPP R12 standard).

Besides the corresponding relationship adopted to represent the CSI-RS pattern in the configured special slot, an OFDM symbol offset manner may also be adopted for representation.

On such a basis, the second acquisition unit 103 is specifically configured to acquire a CSI-RS configuration in the special slot indicated by the second field, where the CSI-RS configuration in the special slot is generated according to an offset of the CSI-RS pattern in the special slot from the default CSI-RS pattern, and determine the CSI-RS pattern in the special slot is determined according to the configuration and the default CSI-RS pattern, where, when l' in the default CSI-RS pattern is more than 3, the CSI-RS pattern in the special slot is obtained by shifting the default CSI-RS pattern leftwards by 3 OFDM symbols;

when l' in the default CSI-RS pattern is less than or equal to 3, the CSI-RS pattern in the special slot is obtained by shifting l' in the default CSI-RS pattern leftwards by 4 OFDM symbols; and the location of the RE occupied by the CSI-RS in the PRB pair is represented by (k', l'), k' represents the row where the RE is located, each row is a subcarrier, represents the column where the RE is located, and each column is an OFDM symbol.

During a practical application, the receiving unit 101 may be implemented by a receiver in the UE; and the first acquisition unit 102 and the second acquisition unit 103 may be implemented by a CPU, MCU, DSP or FPGA in the UE.

Figure 11:
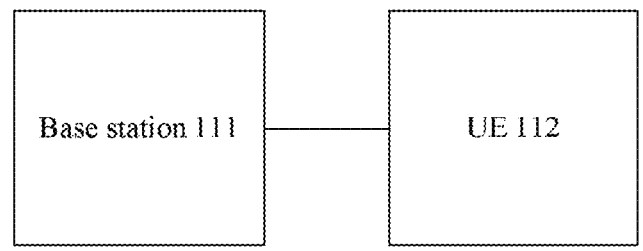
FIG. 11 is a structure diagram of a CSI-RS indication system according to some embodiments of the disclosure.

For implementing the method of the embodiments of the disclosure, the embodiments further provide a CSI-RS indication system. As shown in FIG. 11, the system includes: a base station 111 and UE 112, where the base station 111 is configured to, when a CSI-RS is transmitted through a DwPTS, generate RRC signaling that indicates a CSI-RS resource configuration, and send the RRC signaling to the UE 112, where, when the RRC signaling that indicates the CSI-RS resource configuration is generated, a first field in the RRC signaling is configured to indicate a special slot, and a second field in the RRC signaling is configured to indicate a CSI-RS pattern in the special slot; and the UE 112 is configured to receive the RRC signaling, acquire the first field in the RRC signaling, and when the first field is determined to indicate the special slot and the UE meets a preset condition, determine the CSI-RS pattern in the special slot according to the CSI-RS pattern indicated by the second field in the RRC signaling.

Here, the first field indicates a CSI-RS subframe configuration, and the second field indicates a CSI-RS configuration. It should be noted that specific processing processes of the base station 111 and the UE 112 have been described above in detail and will not be elaborated herein.

According to the CSI-RS indication solution provided by the embodiments, when the CSI-RS is transmitted through the DwPTS, the base station generates the RRC signaling that indicates the CSI-RS resource configuration, and sends the RRC signaling to the UE, where, when the RRC signaling that indicates the CSI-RS resource configuration is generated, the first field in the RRC signaling is configured to indicate the special slot, and the second field in the RRC signaling is configured to indicate the CSI-RS pattern in the special slot; and the UE receives the RRC signaling, acquires the first field in the RRC signaling, and when the first field is determined to indicate the special slot and the UE meets the preset condition, determines the CSI-RS pattern in the special slot according to the CSI-RS pattern indicated by the second field in the RRC signaling, the first field indicating the CSI-RS subframe configuration and the second field indicating the CSI-RS configuration. Only a CSI-RS chapter in the 36211 standard is required to be modified, that is, the configuration in the DwPTS is added, the configuration information may be described in three forms of a new table, a formula and an offset, the 36331 standard is not modified, and the new UE utilizes the related RRC signaling for re-reading. Therefore, the related RRC signaling is not required to be modified, and a signaling overhead is greatly reduced.

Those skilled in the art should know that the embodiment of the disclosure may be provided as a method, a system or a computer program product. Therefore, the disclosure may adopt a form of hardware embodiment, software embodiment and combined software and hardware embodiment. Moreover, the disclosure may adopt a form of computer program product implemented on one or more computer-available storage media (including, but not limited to, a disk memory and an optical memory) including computer-available program codes.

The disclosure is described with reference to flowcharts and/or block diagrams of the method, equipment (system) and computer program product according to the embodiment of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing equipment, so that a series of operating steps are executed on the computer or the other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

The above is only the optional embodiment of the disclosure and not intended to limit the scope of protection of the disclosure.

The invention claimed is:

1. A Channel State Information-Reference Signal (CSI-RS) indication method, applied to a base station, the method comprising:
   when a CSI-RS is transmitted through a Downlink Pilot Time Slot (DwPTS), generating Radio Resource Control (RRC) signaling that indicates a CSI-RS resource configuration; and
   sending the RRC signaling to User Equipment (UE),
   wherein generating the RRC signaling that indicates the CSI-RS resource configuration, comprises:
   configuring a first field in the RRC signaling to indicate a special slot, and configuring a second field in the RRC signaling to indicate a CSI-RS pattern in the special slot;
   wherein the special slot is configured to indicate the UE meeting a preset condition to acquire the CSI-RS pattern indicated by the second field; and
   wherein the first field indicates a CSI-RS subframe configuration, and the second field indicates a CSI-RS configuration,
   wherein configuring the second field in the RRC signaling to indicate the CSI-RS pattern in the special slot comprises:
   generating a CSI-RS configuration in the special slot according to an offset of the CSI-RS pattern in the special slot from a default CSI-RS pattern, wherein,
   when l' in the default CSI-RS pattern is more than 3, the CSI-RS pattern in the special slot is obtained by shifting the default CSI-RS pattern leftwards by 3 Orthogonal Frequency Division Multiplexing (OFDM) symbols;
   when l' in the default CSI-RS pattern is less than or equal to 3, the CSI-RS pattern in the special slot is obtained by shifting l' in the default CSI-RS pattern leftwards by 4 OFDM symbols; and
   a location of a Resource Element (RE) occupied by a CSI-RS in a Physical Resource Block (PRB) pair is represented by (k', l'), k' represents a row where the RE is located, each row is a subcarrier, l' represents a column where the RE is located, and each column is an OFDM symbol.

2. The method according to claim 1, wherein the first field is subframeConfig-r12, and the second field is resourceConfig-r12;
   or, the first field is subframeConfig-r11, and the second field is resourceConfig-r11 or resourceConfigList-r11;
   or, the first field is subframeConfig-r10, and the second field is resourceConfig-r10.

3. The method according to claim 2, wherein configuring the second field in the RRC signaling to indicate the CSI-RS pattern in the special slot comprises:
   configuring the second field to be a serial number corresponding to the CSI-RS pattern in the special slot in a CSI-RS configuration parameter table;
   wherein the CSI-RS configuration parameter indication table comprises 20 1-port CSI-RS configuration parameters, 20 2-port CSI-RS configuration parameters, 10 4-port CSI-RS configuration parameters and 5 8-port CSI-RS configuration parameters,
   the 20 1-port CSI-RS configuration parameters are the same as the 20 2-port CSI-RS configuration parameters.

4. The method according to claim 3, wherein, when the second field is resourceConfig-r12, resourceConfig-r11 or resourceConfig-r10, the second field has a value up to 20; and
   when the second field is resourceConfigList-r11, resourceConfigList-r11 has a value up to 10, and indicates a plurality of 4-port and 8-port CSI-RS configuration parameters.

5. The method according to claim 1, wherein configuring the second field in the RRC signaling to indicate the CSI-RS pattern in the special slot comprises:
   configuring the second field to be a serial number corresponding to the CSI-RS pattern in the special slot in a CSI-RS configuration parameter table;
   wherein the CSI-RS configuration parameter indication table comprises 20 1-port CSI-RS configuration parameters, 20 2-port CSI-RS configuration parameters, 10 4-port CSI-RS configuration parameters and 5 8-port CSI-RS configuration parameters,
   the 20 1-port CSI-RS configuration parameters are the same as the 20 2-port CSI-RS configuration parameters.

6. The method according to claim 5, wherein the 20 1-port or 2-port CSI-RS configuration parameters comprise the following parameters: k' is 9, l' is 2 and ns mod 2 is 0; k' is 8, l' is 2 and ns mod 2 is 0; k' is 3, l' is 2 and ns mod 2 is 0; k' is 2, l' is 2 and ns mod 2 is 0; k' is 11, l' is 5 and ns mod 2 is 0; k' is 10, l' is 5 and ns mod 2 is 0; k' is 7, l' is 5 and ns mod 2 is 0; k' is 6, l' is 5 and ns mod 2 is 0; k' is 5, l' is 5 and ns mod 2 is 0; k' is 4, l' is 5 and ns mod 2 is 0; k' is 1, l' is 5 and ns mod 2 is 0; k' is 0, l' is 5 and ns mod 2 is 0; k' is 9, l' is 5 and ns mod 2 is 0; k' is 8, l' is 5 and ns mod 2 is 0; k' is 3, l' is 5 and ns mod 2 is 0; k' is 2, l' is 5 and ns mod 2 is 0; k' is 9, l' is 2 and ns mod 2 is 1; k' is 8, l' is 2 and ns mod 2 is 1; k' is 3, l' is 2 and ns mod 2 is 1; and k' is 2, l' is 2 and ns mod 2 is 1, wherein
   the location of the RE occupied by the CSI-RS in the PRB pair is represented by (k', l'), k' represents the row where the RE is located, l' represents the column where the RE is located, and ns represents a slot number.

7. The method according to claim 5, wherein the 10 4-port CSI-RS configuration parameters comprise the following parameters: k' is 9, l' is 2 and ns mod 2 is 0; k' is 8, l' is 2 and ns mod 2 is 0; k' is 11, l' is 5 and ns mod 2 is 0; k' is 10, l' is 5 and ns mod 2 is 0; k' is 7, l' is 5 and ns mod 2 is 0; k' is 6, l' is 5 and ns mod 2 is 0; k' is 5, l' is 5 and ns mod 2 is 0; k' is 8, l' is 5 and ns mod 2 is 0; k' is 9, l' is 2 and ns mod 2 is 1; and k' is 8, l' is 2 and ns mod 2 is 1, wherein
the location of the RE occupied by the CSI-RS in the PRB pair is represented by (k', l'), k' represents the row where the RE is located, l' represents the column where the RE is located, and ns represents a slot number.

8. The method according to claim 5, wherein the 5 8-port CSI-RS configuration parameters comprise the following parameters: k' is 9, l' is 2 and ns mod 2 is 0; k' is 11, l' is 5 and ns mod 2 is 0; k' is 7, l' is 5 and ns mod 2 is 0; k' is 9, l' is 5 and ns mod 2 is 0; and k' is 9, l' is 2 and ns mod 2 is 1, wherein
the location of the RE occupied by the CSI-RS in the PRB pair is represented by (k', l'), k' represents the row where the RE is located, l' represents the column where the RE is located, and ns represents a slot number.

9. The method according to claim 1, wherein configuring the second field in the RRC signaling to indicate the CSI-RS pattern in the special slot comprises:
configuring the second field to indicate a corresponding relationship between the default CSI-RS pattern and the CSI-RS pattern in the special slot, the corresponding relationship comprising a corresponding relationship between l' and ns mod 2,
wherein, when l' in the default CSI-RS pattern is more than 3, l' in the CSI-RS pattern in the special slot is a difference between l' in the default CSI-RS pattern and 3;
when l' in the default CSI-RS pattern is less than or equal to 3, l' in the CSI-RS pattern in the special slot is a remainder obtained through dividing, by 7, a sum of l' in the default CSI-RS pattern and 10;
when l' in the default CSI-RS pattern is more than 3 and ns mod 2 in the default CSI-RS pattern is equal to 1, ns mod 2 in the CSI-RS pattern in the special slot is 1;
except when l' in the default CSI-RS pattern is more than 3 and ns mod 2 in the default CSI-RS pattern is equal to 1, ns mod 2 in the CSI-RS pattern in the special slot is 0; and
the location of the RE occupied by the CSI-RS in the PRB pair is represented by (k', l'), k' represents the row where the RE is located, l' represents the column where the RE is located, and ns represents a slot number.

10. A Channel State Information-Reference Signal (CSI-RS) indication method, applied to User Equipment (UE), the method comprising:
when a CSI-RS is transmitted through a Downlink Pilot Time Slot (DwPTS), receiving Radio Resource Control (RRC) signaling that indicates a CSI-RS resource configuration;
acquiring a first field in the RRC signaling; and
when the first field is determined to indicate a special slot and the UE meets a preset condition, determining a CSI-RS pattern in the special slot according to a CSI-RS pattern indicated by a second field in the RRC signaling, wherein the first field indicates a CSI-RS subframe configuration and the second field indicates a CSI-RS configuration,
wherein determining the CSI-RS pattern in the special slot according to the CSI-RS pattern indicated by the second field in the RRC signaling comprises:
acquiring a CSI-RS configuration in the special slot indicated by the second field, wherein the CSI-RS configuration in the special slot is generated according to an offset of the CSI-RS pattern in the special slot from a default CSI-RS pattern; and determining the CSI-RS pattern in the special slot according to the CSI-RS configuration indicated by the second field and the default CSI-RS pattern, wherein,
when l' in the default CSI-RS pattern is more than 3, the CSI-RS pattern in the special slot is obtained by shifting the default CSI-RS pattern leftwards by 3 Orthogonal Frequency Division Multiplexing (OFDM) symbols;
when l' in the default CSI-RS pattern is less than or equal to 3, the CSI-RS pattern in the special slot is obtained by shifting l' in the default CSI-RS pattern leftwards by 4 OFDM symbols; and
a location of a Resource Element (RE) occupied by a CSI-RS in a Physical Resource Block (PRB) pair is represented by (k', l'), k' represents a row where the RE is located, each row is a subcarrier, l' represents a column where the RE is located, and each column is an OFDM symbol.

11. The method according to claim 10, wherein the first field is subframeConfig-r12, and the second field is resourceConfig-r12;
or, the first field is subframeConfig-r11, and the second field is resourceConfig-r11 or resourceConfigList-r11;
or, the first field is subframeConfig-r10, and the second field is resourceConfig-r10.

12. The method according to claim 11, wherein
determining the CSI-RS pattern in the special slot according to the CSI-RS pattern indicated by the second field in the RRC signaling comprises:
acquiring, in a CSI-RS configuration parameter indication table, a serial number corresponding to the CSI-RS pattern in the special slot indicated by the second field; and
determining the CSI-RS pattern in the special slot according to an acquired number of CSI-RS ports and the serial number, wherein
the CSI-RS configuration parameter indication table comprising 20 1-port CSI-RS configuration parameters, 20 2-port CSI-RS configuration parameters, 10 4-port CSI-RS configuration parameters and 5 8-port CSI-RS configuration parameters, the 20 1-port CSI-RS configuration parameters are the same as the 20 2-port CSI-RS configuration parameters.

13. The method according to claim 12, wherein, when the second field is resourceConfig-r12, resourceConfig-r11 or resourceConfig-r10, the second field has a value up to 20; and
when the second field is resourceConfigList-r11, resourceConfigList-r11 has a value up to 10, and indicates a plurality of 4-port and 8-port CSI-RS configuration parameters.

14. The method according to claim 10, wherein
determining the CSI-RS pattern in the special slot according to the CSI-RS pattern indicated by the second field in the RRC signaling comprises:
acquiring, in a CSI-RS configuration parameter indication table, a serial number corresponding to the CSI-RS pattern in the special slot indicated by the second field; and
determining the CSI-RS pattern in the special slot according to an acquired number of CSI-RS ports and the serial number,
the CSI-RS configuration parameter indication table comprising 20 1-port CSI-RS configuration parameters, 20 2-port CSI-RS configuration parameters, 10 4-port CSI-RS configuration parameters and 5 8-port CSI-RS configuration parameters, wherein the 20 1-port CSI-RS configuration parameters are the same as the 20 2-port CSI-RS configuration parameters.

15. The method according to claim 14, wherein the 20 1-port or 2-port CSI-RS configuration parameters comprise the following parameters: k' is 9, l' is 2 and ns mod 2 is 0; k' is 8, l' is 2 and ns mod 2 is 0; k' is 3, l' is 2 and ns mod 2 is 0; k' is 2, l' is 2 and ns mod 2 is 0; k' is 11, l' is 5 and ns mod 2 is 0; k' is 10, l' is 5 and ns mod 2 is 0; k' is 7, l' is 5 and ns mod 2 is 0; k' is 6, l' is 5 and ns mod 2 is 0; k' is 5, l' is 5 and ns mod 2 is 0; k' is 4, l' is 5 and ns mod 2 is 0; k' is 1, l' is 5 and ns mod 2 is 0; k' is 0, l' is 5 and ns mod 2 is 0; k' is 9, l' is 5 and ns mod 2 is 0; k' is 8, l' is 5 and ns mod 2 is 0; k' is 3, l' is 5 and ns mod 2 is 0; k' is 2, l' is 5 and ns mod 2 is 0; k' is 9, l' is 2 and ns mod 2 is 1; k' is 8, l' is 2 and ns mod 2 is 1; k' is 3, l' is 2 and ns mod 2 is 1; and k' is 2, l' is 2 and ns mod 2 is 1, wherein
the location of the RE occupied by the CSI-RS in the PRB pair is represented by (k', l'), k' represents the row where the RE is located, l' represents the column where the RE is located, and ns represents a slot number.

16. The method according to claim 14, wherein the 10 4-port CSI-RS configuration parameters comprise the following parameters: k' is 9, l' is 2 and ns mod 2 is 0; k' is 8, l' is 2 and ns mod 2 is 0; k' is 11, l' is 5 and ns mod 2 is 0; k' is 10, l' is 5 and ns mod 2 is 0; k' is 7, l' is 5 and ns mod 2 is 0; k' is 6, l' is 5 and ns mod 2 is 0; k' is 5, l' is 5 and ns mod 2 is 0; k' is 8, l' is 5 and ns mod 2 is 0; k' is 9, l' is 2 and ns mod 2 is 1; and k' is 8, l' is 2 and ns mod 2 is 1, wherein
the location of the RE occupied by the CSI-RS in the PRB pair is represented by (k', l'), k' represents the row where the RE is located, l' represents the column where the RE is located, and ns represents a slot number.

17. The method according to claim 14, wherein the 5 8-port CSI-RS configuration parameters comprise the following parameters: k' is 9, l' is 2 and ns mod 2 is 0; k' is 11, l' is 5 and ns mod 2 is 0; k' is 7, l' is 5 and ns mod 2 is 0; k' is 9, l' is 5 and ns mod 2 is 0; and k' is 9, l' is 2 and ns mod 2 is 1, wherein
the location of the RE occupied by the CSI-RS in the PRB pair is represented by (k', l'), k' represents the row where the RE is located, l' represents the column where the RE is located, and ns represents a slot number.

18. The method according to claim 10, wherein determining the CSI-RS pattern in the special slot according to the CSI-RS pattern indicated by the second field in the RRC signaling comprises:
acquiring a corresponding relationship, indicated by the second field, between the default CSI-RS pattern and the CSI-RS pattern in the special slot, the corresponding relationship comprising a corresponding relationship between l' and ns mod 2; and
determining the CSI-RS pattern in the special slot according to the corresponding relationship and the default CSI-RS pattern, wherein
determining the CSI-RS pattern in the special slot according to the corresponding relationship and the default CSI-RS pattern comprises:
when l' in the default CSI-RS pattern is more than 3, calculating a difference between l' in the default CSI-RS pattern and 3 to obtain l' in the CSI-RS pattern in the special slot;
when l' in the default CSI-RS pattern is less than or equal to 3, determining l' in the CSI-RS pattern in the special slot to be a remainder obtained through dividing, by 7, a sum of l' in the default CSI-RS pattern and 10;

when l' in the default CSI-RS pattern is more than 3 and ns mod 2 in the default CSI-RS pattern is equal to 1, determining ns mod 2 in the CSI-RS pattern in the special slot to be 1; and
except when l' in the default CSI-RS pattern is more than 3 and ns mod 2 in the default CSI-RS pattern is equal to 1, determining ns mod 2 in the CSI-RS pattern in the special slot to be 0,
the location of the RE occupied by the CSI-RS in the PRB pair being represented by (k', l'), k' indicating the row where the RE is located, l' indicating the column where the RE is located and ns indicating a slot number.

19. A base station, comprising a processor and one or more units stored on a memory and executable by the processor, the one or more units comprising a generation unit and a sending unit, wherein
the generation unit is configured to, when a Channel State Information-Reference Signal (CSI-RS) is transmitted through a Downlink Pilot Time Slot (DwPTS), generate Radio Resource Control (RRC) signaling that indicates a CSI-RS resource configuration; and
the sending unit is configured to send the RRC signaling to User Equipment (UE), wherein,
when the RRC signaling that indicates the CSI-RS resource configuration is generated, the generation unit configures a first field in the RRC signaling to indicate a special slot and configures a second field in the RRC signaling to indicate a CSI-RS pattern in the special slot;
the configured special slot is configured to indicate the UE meeting a preset condition to acquire the CSI-RS pattern indicated by the second field; and
the first field indicates a CSI-RS subframe configuration, and the second field indicates a CSI-RS configuration, wherein the generation unit is configured to:
generate a CSI-RS configuration in the special slot according to an offset of the CSI-RS pattern in the special slot from a default CSI-RS pattern, wherein,
when l' in the default CSI-RS pattern is more than 3, the CSI-RS pattern in the special slot is obtained by shifting the default CSI-RS pattern leftwards by 3 Orthogonal Frequency Division Multiplexing (OFDM) symbols;
when l' in the default CSI-RS pattern is less than or equal to 3, the CSI-RS pattern in the special slot is obtained by shifting l' in the default CSI-RS pattern leftwards by 4 OFDM symbols; and
a location of a Resource Element (RE) occupied by a CSI-RS in a Physical Resource Block (PRB) pair is represented by (k', l'), k' represents a row where the RE is located, each row is a subcarrier, l' represents a column where the RE is located, and each column is an OFDM symbol.

20. The base station according to claim 19, wherein the generation unit is configured to configure the second field to be a serial number corresponding to the CSI-RS pattern in the special slot in a CSI-RS configuration parameter table; and
the CSI-RS configuration parameter indication table comprises 20 1-port CSI-RS configuration parameters, 20 2-port CSI-RS configuration parameters, 10 4-port CSI-RS configuration parameters and 5 8-port CSI-RS configuration parameters, wherein
the 20 1-port CSI-RS configuration parameters are the same as the 20 2-port CSI-RS configuration parameters.

21. The base station according to claim 19, wherein the generation unit is configured to configure the second field to indicate a corresponding relationship between the default CSI-RS pattern and the CSI-RS pattern in the special slot, the corresponding relationship comprising a corresponding relationship between l' and ns mod 2, wherein,
- when l' in the default CSI-RS pattern is more than 3, l' in the CSI-RS pattern in the special slot is a difference between l' in the default CSI-RS pattern and 3;
- when l' in the default CSI-RS pattern is less than or equal to 3, l' in the CSI-RS pattern in the special slot is a remainder obtained through dividing, by 7, a sum of l' in the default CSI-RS pattern and 10;
- when l' in the default CSI-RS pattern is more than 3 and ns mod 2 in the default CSI-RS pattern is equal to 1, ns mod 2 in the CSI-RS pattern in the special slot is 1;
- except when l' in the default CSI-RS pattern is more than 3 and ns mod 2 in the default CSI-RS pattern is equal to 1, ns mod 2 in the CSI-RS pattern in the special slot is 0; and
- the location of the RE occupied by the CSI-RS in the PRB pair is represented by (k', l'), k' represents the row where the RE is located, l' represents the column where the RE is located, and ns represents a slot number.

22. User Equipment (UE), comprising a processor and one or more units stored on a memory and executable by the processor, the one or more units comprises: a receiving unit, a first acquisition unit and a second acquisition unit, wherein
- the receiving unit is configured to, when a Channel State Information-Reference Signal (CSI-RS) is transmitted through a Downlink Pilot Time Slot (DwPTS), receive Radio Resource Control (RRC) signaling that indicates a CSI-RS resource configuration;
- the first acquisition unit is configured to acquire a first field in the RRC signaling; and
- the second acquisition unit is configured to, when the first field is determined to indicate a special slot and the UE meets a preset condition, determine a CSI-RS pattern in the special slot according to a CSI-RS pattern indicated by a second field in the RRC signaling,
- the first field indicates a CSI-RS subframe configuration and the second field indicates a CSI-RS configuration, wherein the second acquisition unit is configured to:
- acquire a CSI-RS configuration in the special slot indicated by the second field, wherein the CSI-RS configuration in the special slot is generated according to an offset of the CSI-RS pattern in the special slot from a default CSI-RS pattern, and
- determine the CSI-RS pattern in the special slot according to the CSI-RS configuration indicated by the second field and the default CSI-RS pattern, wherein,
- when l' in the default CSI-RS pattern is more than 3, the CSI-RS pattern in the special slot is obtained by shifting the default CSI-RS pattern leftwards by 3 Orthogonal Frequency Division Multiplexing (OFDM) symbols;
- when l' in the default CSI-RS pattern is less than or equal to 3, the CSI-RS pattern in the special slot is obtained by shifting l' in the default CSI-RS pattern leftwards by 4 OFDM symbols; and
- a location of a Resource Element (RE) occupied by a CSI-RS in a Physical Resource Block (PRB) pair is represented by (k', l'), k' represents a row where the RE is located, each row is a subcarrier, l' represents a column where the RE is located, and each column is an OFDM symbol.

23. The UE according to claim 22, wherein the second acquisition unit is configured to acquire, in a CSI-RS configuration parameter indication table, a serial number corresponding to the CSI-RS pattern in the special slot indicated by the second field, and determine the CSI-RS pattern in the special slot according to an acquired number of CSI-RS ports and the serial number,
- the CSI-RS configuration parameter indication table comprises 20 1-port CSI-RS configuration parameters, 20 2-port CSI-RS configuration parameters, 10 4-port CSI-RS configuration parameters and 5 8-port CSI-RS configuration parameters, wherein
- the 20 1-port CSI-RS configuration parameters of are the same as the 20 2-port CSI-RS configuration parameters.

24. The UE according to claim 22, wherein the second acquisition unit is configured to:
- acquire a corresponding relationship, indicated by the second field, between the default CSI-RS pattern and the CSI-RS pattern in the special slot, the corresponding relationship comprising a corresponding relationship between l' and ns mod 2, and
- determine the CSI-RS pattern in the special slot according to the corresponding relationship and the default CSI-RS pattern, wherein
- determining the CSI-RS pattern in the special slot according to the corresponding relationship and the default CSI-RS pattern comprises:
- when l' in the default CSI-RS pattern is more than 3, calculating a difference between l' in the default CSI-RS pattern and 3 to obtain l' in the CSI-RS pattern in the special slot;
- when l' in the default CSI-RS pattern is less than or equal to 3, determining l' in the CSI-RS pattern in the special slot to be a remainder obtained through dividing, by 7, a sum of l' in the default CSI-RS pattern and 10;
- when l' in the default CSI-RS pattern is more than 3 and ns mod 2 in the default CSI-RS pattern is equal to 1, determining ns mod 2 in the CSI-RS pattern in the special slot to be 1; and
- except when l' in the default CSI-RS pattern is more than 3 and ns mod 2 in the default CSI-RS pattern is equal to 1, determining ns mod 2 in the CSI-RS pattern in the special slot to be 0,
- the location of the RE occupied by the CSI-RS in the PRB pair being represented by (k', l'), k' indicating the row where the RE is located, l' indicating the column where the RE is located and ns indicating a slot number.

* * * * *